(12) United States Patent
Shirakawa et al.

(10) Patent No.: US 12,722,700 B2
(45) Date of Patent: Sep. 1, 2026

(54) POSITION DETECTION DEVICE

(71) Applicant: Proterial, Ltd., Tokyo (JP)

(72) Inventors: Yohei Shirakawa, Tokyo (JP); Yoshiaki Yanagisawa, Tokyo (JP); Yuta Sugiyama, Tokyo (JP); Naoki Futakuchi, Tokyo (JP)

(73) Assignee: Proterial, Ltd., Tokyo (JP)

( * ) Notice: Subject to any disclaimer, the term of this patent is extended or adjusted under 35 U.S.C. 154(b) by 308 days.

(21) Appl. No.: 18/643,529

(22) Filed: Apr. 23, 2024

(65) Prior Publication Data

US 2024/0359738 A1 Oct. 31, 2024

(30) Foreign Application Priority Data

Apr. 28, 2023 (JP) ................................ 2023-074358
Aug. 10, 2023 (JP) ................................ 2023-131246

(51) Int. Cl.
*B62D 15/02* (2006.01)
*G01D 5/14* (2006.01)
*G05D 1/243* (2024.01)

(52) U.S. Cl.
CPC ......... *B62D 15/0225* (2013.01); *G01D 5/145* (2013.01); *G05D 1/2437* (2024.01)

(58) Field of Classification Search
CPC ... B62D 15/0225; G01D 5/145; G05D 1/2437
See application file for complete search history.

(56) References Cited

U.S. PATENT DOCUMENTS

2022/0306192 A1* 9/2022 Scheer ..................... B62D 6/10
2023/0286582 A1* 9/2023 Case Myers ............ F16H 25/24
2024/0109586 A1* 4/2024 Kim .................. B62D 15/0225

FOREIGN PATENT DOCUMENTS

WO 2021/210125 A1 10/2021

* cited by examiner

*Primary Examiner* — Giovanni Astacio-Oquendo
(74) *Attorney, Agent, or Firm* — Studebaker Brackett PLLC

(57) ABSTRACT

A position detection device, configured to detect a position of a shaft that moves forward and backward in an axial direction, is provided with an excitation coil that generates an alternating magnetic field; a target which is fixed to the shaft and in which a magnetic flux of the alternating magnetic field is interlinked; and a detection coil in which the magnetic flux of the alternating magnetic field is interlinked, wherein the detection coil has a first portion and a second portion, where an induced voltage is generated by the magnetic flux of the alternating magnetic field being interlinked, and a connecting path connecting the first portion and the second portion. The first portion and the second portion respectively extend along the axial direction and the coil longitudinal direction parallel to the axial direction and at least a portion of each is aligned in an alignment direction perpendicular to the axial direction. The target includes a first target portion facing the first portion, and a second target portion facing the second portion. The induced voltage generated in the first portion changes according to a position of the first target portion relative to the first portion. The induced voltage generated in the second portion changes according to a position of the second target portion relative to the second portion.

14 Claims, 28 Drawing Sheets

30
301
32b
32a
3
3a
302
33b
33a
321,331
323,333
313
322,332
21
$L_{21}$
$L_1$
301,302
311
312
33
32
22
31
314
$L_2$
$L_{22}$ 31
311
312
313
314
315
316
32
32a
32b
321
322
323
324
325
326
33
33a
33b
331
332
333
334
335
336

313
311
312
333
323
336
331
31
332
33a
33b
326
33
322
32a
32b
32
321
325
335
334
324
3A
314
315
316

4
411
41
43
42
L21
L1
21
64
414
433
C
431
63
62
61
6
44
5
45
421
423
413
422
46
B
22
432
412
D
L2
L22
E
E 452a
452b
452
452c
451b
451a
451
451c 434
434b
431a
434a
424a
424b
421a
421b
433d
433a
423d
423a
424
431b 433d
432a
435b
435
433a
423d
423a
422b
435a
422a
425b
425
425a
432b 423c
423b
433c
433b
4b
404
407
403
406
402
405
401
4a
423a
423d
433a
433d 401
413
D
411
412
C
B
414

435
425
472

434
424
471

402
D
C
B 452a
451a 431a
421a
421b
431b
424b
424a
434b
434a
433d
433a
423d
423a 433d
433a
423d
423a
425b
425a
435b
435a
432a
432b
422b
422a 404
413
411
412
414
C
B
D 435
425
482

434
424
481

L21
L1
21
423
413
422
D
421
42
43
41
E
E
411
412
432
4A
22
L2
L22
431
C
433
45
B
414
46
64
63
62
61
6
44
5

421
413
426
422
H
42
43
41
I
411
412
491,492
432
4A
431
G
436
45
F
414
46
64
63
62
61
6
44
5
436a
426a
426b
491,492
432a
422b
422a
432b
431a
421a
421b
431b
426b
426a
436a
436b
452a
452c
451b
451c
452b
452
451
451a

G
401
F
491
H

491

491

402
H
G
F 436a
426a
426b
432a
422b
422a
432b 431a
421a
421b
431b
426b
426a
436a 452a
451a

403
H
G
F 426b
436b 426b
436b
436a 452b
451b

404
H
492
G
F

492

492

POSITION DETECTION DEVICE

CROSS-REFERENCE TO RELATED APPLICATIONS

The present application is based on Japanese patent application No. 2023-074358 filed on Apr. 28, 2023 and Japanese patent application No. 2023-131246 filed on Aug. 10, 2023, the entire contents of which are incorporated herein by reference.

TECHNICAL FIELD

The present invention relates to a position detection device for detecting the position of a shaft that moves forward and backward in the axial direction.

BACKGROUND OF THE INVENTION

Conventionally, a position detection device that detects the position of a shaft that moves forward and backward in the axial direction is being used, for example, to detect the position of a rack shaft in a steering device of a vehicle.

The detection unit described in Patent Literature 1 detects an axial position of a rack shaft of an electric power steering device and includes a DC power supply, a permanent magnet, an element group composed of first to fourth magnetoresistive elements disposed between the permanent magnet and the rack shaft, and a calculation unit for calculating the position of the rack shaft. In the element group, a series circuit including the first and second magnetoresistive elements being connected in series, and a series circuit including the third and fourth magnetoresistive elements being connected in series are connected in parallel to form a bridge circuit. The potential of a first terminal connected between the first and second magnetoresistive elements and a potential of a second terminal connected between the third and fourth magnetoresistive elements are input to the calculation unit. A plurality of grooves extending in a direction inclined with respect to the axial direction of the rack shaft is formed on the surface of the rack shaft facing the element group.

In the detection unit configured as described above, when the rack shaft moves in the axial direction due to the rotation of the pinion gear shaft meshing with the rack shaft and the relative positions of the first to fourth magnetoresistive elements with respect to the grooves change, the balance of electrical resistance of the first to fourth magnetoresistive elements changes, so that the potentials of the first terminal and the second terminal change. The calculation unit calculates the position of the rack shaft based on changes in these potentials.

Citation List Patent Literature 1: WO2021/210125

SUMMARY OF THE INVENTION

In the detection unit described in Patent Literature 1, if the rack shaft is inclined with respect to the vehicle width direction due to, for example, vibrations caused by vehicle running or the like, the distance between the first to fourth magnetoresistive elements and the rack shaft changes and an error occurs in the detection position of the rack shaft.

Accordingly, it is an object of the present invention to provide a position detection device capable of detecting the position of the rack shaft that moves forward and backward in the axial direction with high accuracy.

To solve the problems mentioned above, the present invention provides a position detection device, configured to detect a position of a shaft that moves forward and backward in an axial direction, comprising:

an excitation coil that generates an alternating magnetic field;

a target which is fixed to the shaft and in which a magnetic flux of the alternating magnetic field is interlinked; and a detection coil in which the magnetic flux of the alternating magnetic field is interlinked, wherein the detection coil has a first portion and a second portion, where an induced voltage is generated by the magnetic flux of the alternating magnetic field being interlinked, and a connecting path connecting the first portion and the second portion, wherein the first portion and the second portion respectively extend along the axial direction and the coil longitudinal direction parallel to the axial direction and at least a portion of each is aligned in an alignment direction perpendicular to the axial direction, wherein the target comprises a first target portion facing the first portion, and a second target portion facing the second portion, wherein the induced voltage generated in the first portion changes according to a position of the first target portion relative to the first portion, wherein the induced voltage generated in the second portion changes according to a position of the second target portion relative to the second portion.

Advantageous Effects of the Invention

According to a position detection device of the present invention, it is possible to detect the position of a shaft that moves forward and backward in the axial direction with high accuracy.

DETAILED DESCRIPTION OF THE INVENTION

First Embodiment

Figure 1:
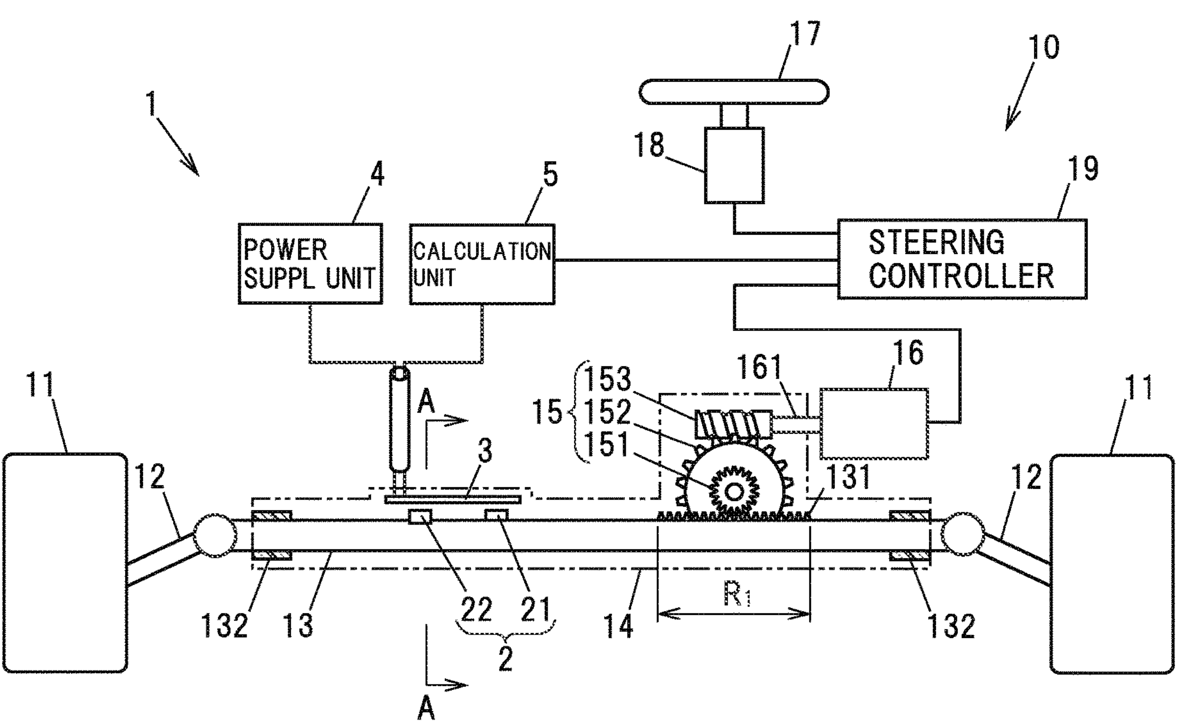
FIG. 1 is a schematic diagram of a vehicle equipped with a steer-by-wire steering device having a stroke sensor as a position detection device according to the first embodiment of the present invention.

FIG. 1 is a schematic diagram of a vehicle equipped with a steer-by-wire steering device 10 with a stroke sensor 1 as a position detection device.

As shown in FIG. 1, the steering device 10 comprises a stroke sensor 1, tie rods 12 connected to the steerable wheels 11 (right and left front wheels), a rack shaft 13 connected to the tie rods 12, a cylindrical housing 14 for accommodating the rack shaft 13, a worm reduction mechanism 15 having a pinion gear 151 meshed with rack teeth 131 of the rack shaft 13, an electric motor 16 that applies a moving force to the rack shaft 13 via the worm reduction mechanism 15, a steering wheel 17 to be operated by the driver, a steering angle sensor 18 that for detecting the steering angle of the steering wheel 17, and a steering controller 19 for controlling the electric motor 16 based on the steering angle detected by the steering angle sensor 18.

In FIG. 1, the housing 14 is shown in a virtual line. The rack shaft 13 is made of a steel material such as carbon steel, and is supported by a pair of rack bushings 132 attached to both ends of the housing 14. The worm reduction mechanism 15 has a worm wheel 152 and a worm gear 153, and a pinion gear 151 is attached to the worm wheel 152. The worm gear 153 is attached to a motor shaft 161 of the electric motor 16.

The electric motor 16 generates torque by a motor current supplied from the steering controller 19 and rotates the worm wheel 152 and the pinion gear 151 via the worm gear 153. When the pinion gear 151 rotates, the rack shaft 13 moves forward and backward in the vehicle width direction to steer the left and right steerable wheels 11. The rack shaft 13 can move rightward and leftward in the vehicle width direction within a predetermined range from the neutral position when the steering angle is zero. In FIG. 1, a double arrow indicates a range $R_1$ where the rack shaft 13 can move in the vehicle width direction.

(Configuration of Stroke Sensor 1)

The stroke sensor 1 has a target (i.e., an object to be detected, detection target) 2 fixed to the rack shaft 13, a substrate 3 arranged to face the target 2 and parallel to the rack shaft 13, a power supply unit 101, and a calculation unit 102. The substrate 3 is fixed in the housing 14, parallel to the rack shaft 13. The stroke sensor 1 detects the position of the rack shaft 13 with respect to the housing 14 by the position of the target 2 and outputs information on the detected position to the steering controller 19. The steering controller 19 controls the electric motor 16 in such a manner that the position of the rack shaft 13 detected by the stroke sensor 1 corresponds to the steering angle of the steering wheel 17 detected by the steering angle sensor 18.

Figure 2:
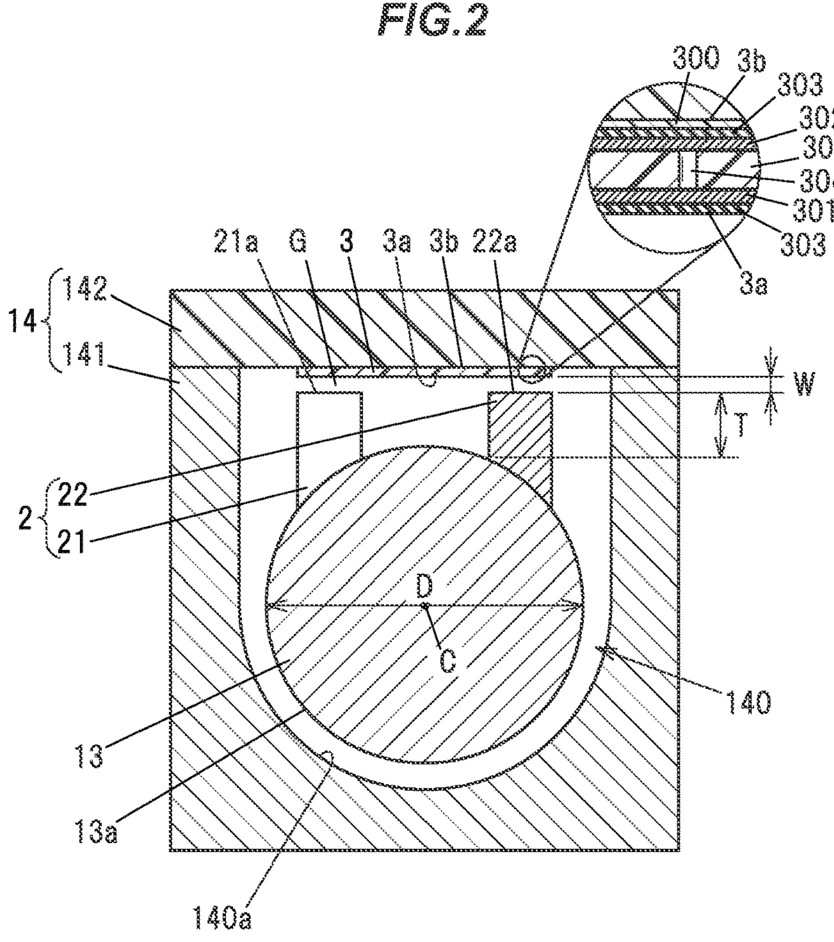
FIG. 2 is a cross-sectional view of a rack shaft, a housing, a target, and a substrate taken along line A-A in FIG. 1.
Figure 3:
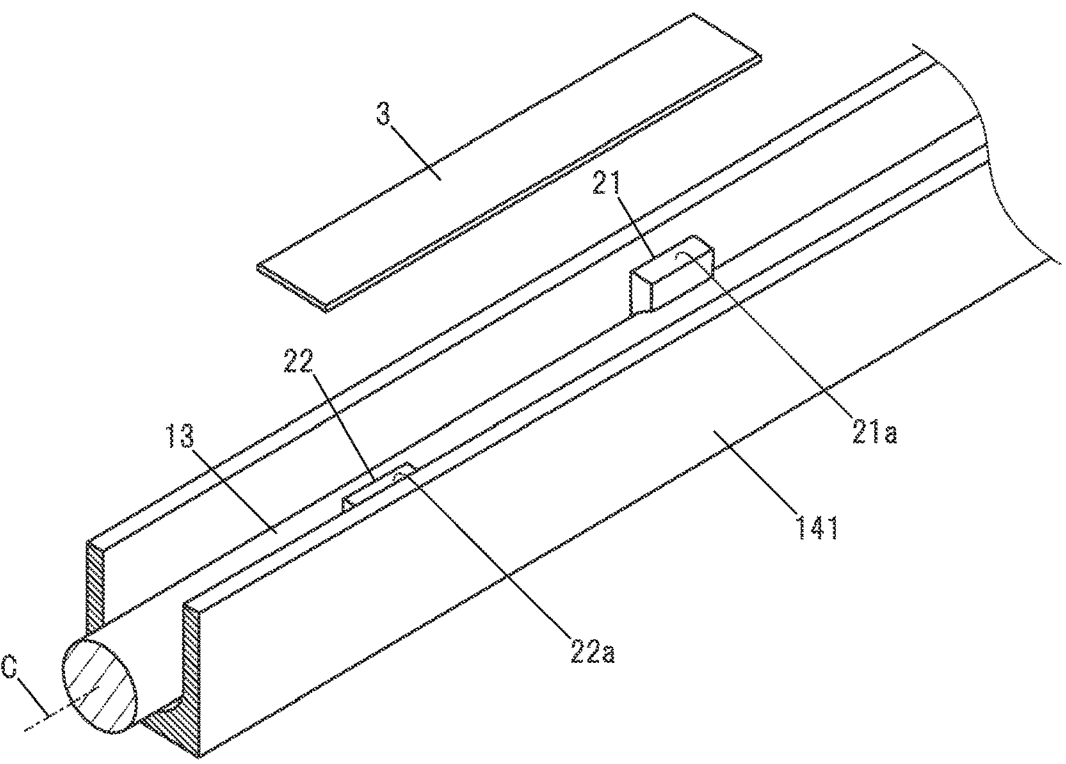
FIG. 3 is a perspective view showing the rack shaft, the housing, the target, and the substrate.

FIG. 2 is a cross-sectional view of the rack shaft 13, the housing 14, the target 2, and the substrate 3 taken along line A-A in FIG. 1. FIG. 3 is a perspective view showing the rack shaft 13, the main body 141 of the housing 14, the target 2, and the substrate 3. In FIG. 3, the center axis C of the rack shaft 13 is indicated by a dash-dot line. The direction parallel to the center axis C of the rack shaft 13 is hereinafter referred to as the axial direction.

The rack shaft 13 is a rod-shaped body made of steel with a circular cross section. The housing 14 has the main body 141 made of metal and a lid 142 made of resin, and the lid 142 is attached to the main body 141 by, for example, adhesion. The main body 141 has a U-shaped cross-section in which an accommodation space 140 for accommodating the rack shaft 13 is formed, and the accommodation space 140 opens upward in the vertical direction. A diameter D of the rack shaft 13 is, for example, 25 mm.

A gap of 1 mm or more, for example, is formed between an outer peripheral surface 13*a* of the rack shaft 13 and an inner surface 140*a* of the accommodation space 140. The lid 142 is formed in a flat plate shape and covers the accommodation space 140 from above in the vertical direction. The main body 141 is a non-magnetic material made of die-cast aluminum alloy, for example. The material of the lid 142 is not necessarily limited to resin, but it is desirable to use a non-magnetic and non-conductive material.

The target 2 consists of a first target portion 21 and a second target portion 22. In the present embodiment, the first target portion 21 and the two second target portion 22 are separate bodies, and the first target portion 21 and the second target portion 22 are fixed to the rack shaft 13 at positions spaced apart in the axial direction of the rack shaft 13. However, the first target portion 21 and the second target portion 22 may be integrated.

The target 2 is made of a material with higher magnetic permeability than that of the rack shaft 13 or a material with higher electrical conductivity than that of the rack shaft 13. When a material with higher magnetic permeability than that of the rack shaft 13 is used as the material of the target 2, it is desirable to use a magnetic material such as ferrite, which has high electrical resistance and is less likely to generate eddy currents. When a material with higher conductivity than that of the rack shaft 13 is used for the target 2, a metal mainly composed of aluminum or copper, for example, may be used as the material.

In the present embodiment, the first target portion 21 and the second target portion 22 protrude from the outer peripheral surface 13*a* of the rack shaft 13 toward the substrate 3. Therefore, even if a material with equal magnetic permeability to the rack shaft 13 or a material with equal electrical conductivity to the rack shaft 13 is used as the material for the target 2, the same actions and effects described below can be obtained. However, in order to increase the accuracy of position detection, it is desirable to use a high permeability material with a higher magnetic permeability than the material of rack shaft 13 or a high conductivity material with a higher conductivity than the material of rack shaft 13 as the material of the target 2.

The first target portion 21 and the second target portion 22 are fixed to the upper part of the rack shaft 13 by means of fixing such as adhesion or welding, for example. The facing surfaces 21*a* and 22*a* of the first and second target portions 21 and 22 facing the substrate 3 are formed in flat shape and disposed in parallel to a front surface 3*a* of the substrate 3 via an air gap G. The back surface 3*b* of the substrate 3 is fixed to the lid 142 by an adhesive 7. The shape of the facing surfaces 21*a* and 22*a* of the first and second target portions 21 and 22, viewed from the substrate 3 side, is a rectangular shape long in the axial direction.

The width W of the air gap G is, for example, 1 mm. A minimum thickness T of the first and second target portions 21 and 22 in the direction perpendicular to the facing surfaces 21*a* and 22*a* is, for example, 5 mm. Furthermore, in the present embodiment, the rack shaft 13 is formed to have a circular cross-section, but the cross-section of the rack shaft 13 is not limited to a circle but may be in a D-shape in which a part is formed in a straight line or in a polygonal shape.

The substrate 3 is a two-layer printed circuit board in which a front surface side wiring layer 301 is formed on the front surface 3*a* side of a flat plate-shaped base material 30 made of a dielectric material such as FR4 (glass fiber impregnated with epoxy resin and heat-cured) and a back surface side wiring layer 302 is formed on the back surface 3*b* side of the base material 30. The front surface side wiring layer 301 and the back surface side wiring layer 302 are covered with a resist film 303 having electrical insulation properties, except for the electrode portion to be described later. The wiring pattern of the front surface side wiring layer 301 and the back surface side wiring layer 302 are connected by a plurality of vias 304 that penetrate the base material 30 in its thickness direction. The substrate 3 is flat and rectangular in shape with the axial direction of the rack shaft 13 being the longitudinal direction. The shortitudinal direction of the substrate 3 is perpendicular to the axial direction.

Figures 4A, 4B, 4C:
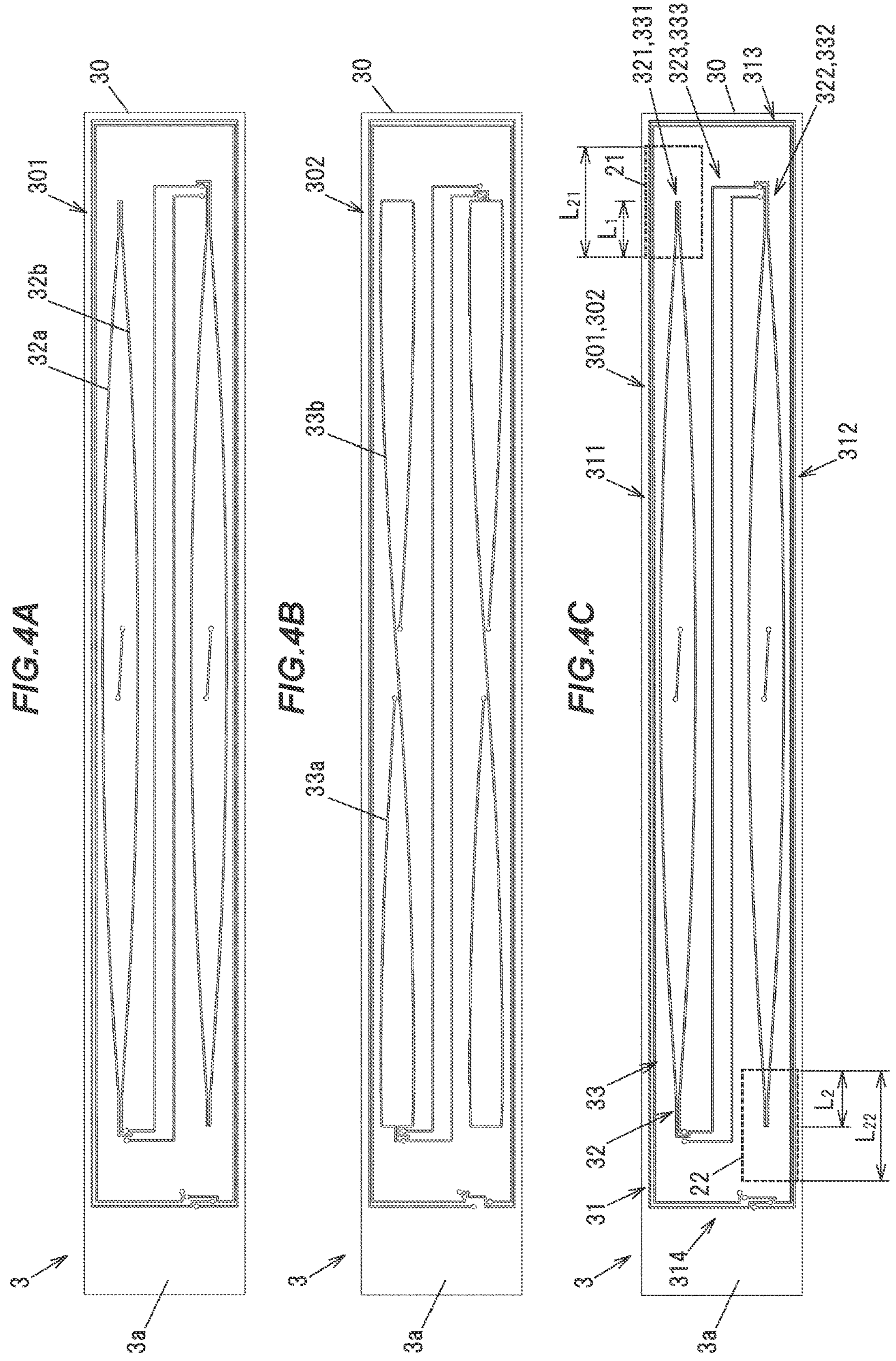
FIG. 4A is a plan view showing the wiring pattern of a front surface side wiring layer on the substrate.
FIG. 4B is a plan view showing the wiring pattern of a back surface side wiring layer.
FIG. 4C is a plan view showing the wiring pattern of the front surface side wiring layer overlaid with the wiring pattern of the back surface side wiring layer as viewed from the front surface side.
Figure 5A:
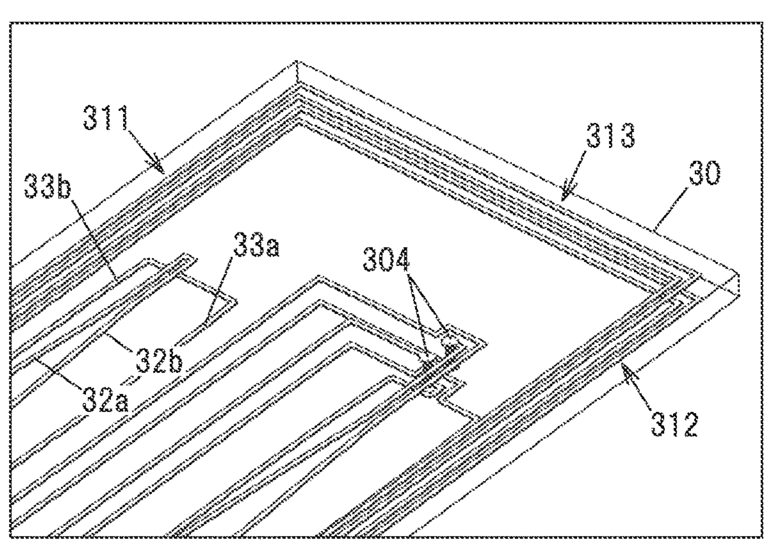
FIGS. 5A to 5C are perspective views showing the wiring patterns of the front surface side wiring layer and the back surface side wiring layer, as viewed through a base material.
Figure 5B:
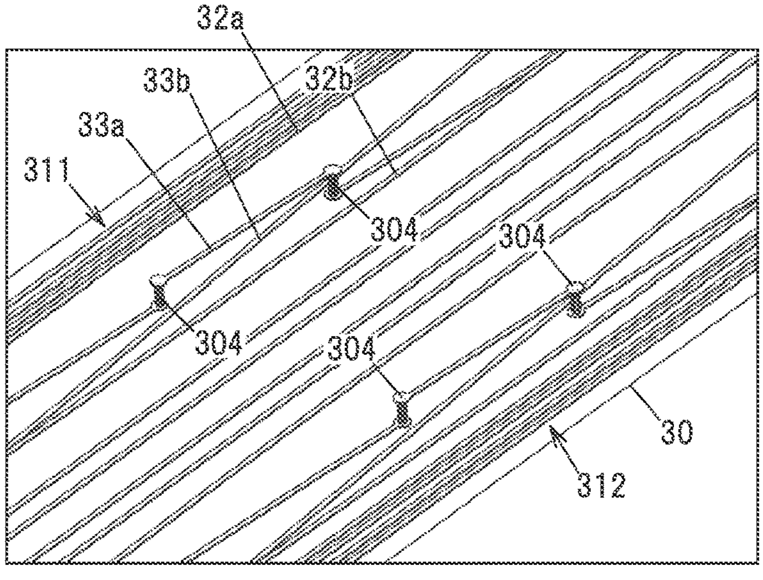
Figure 5C:
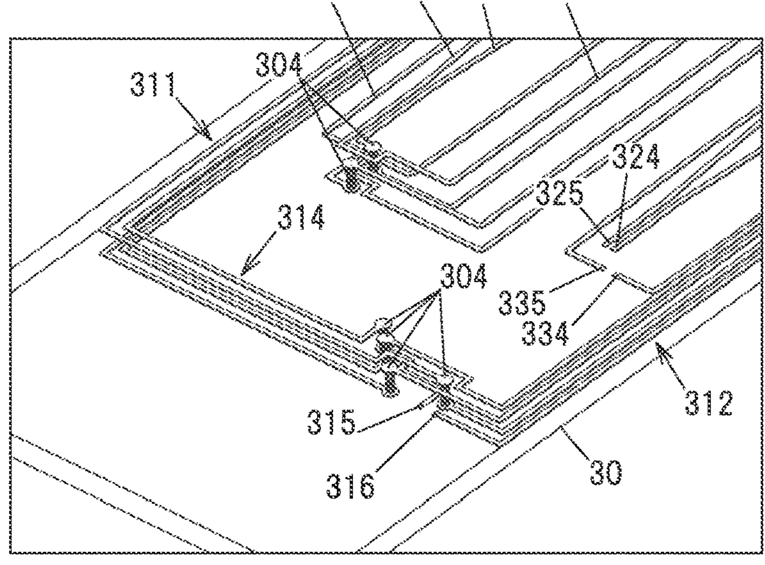
Figure 6:
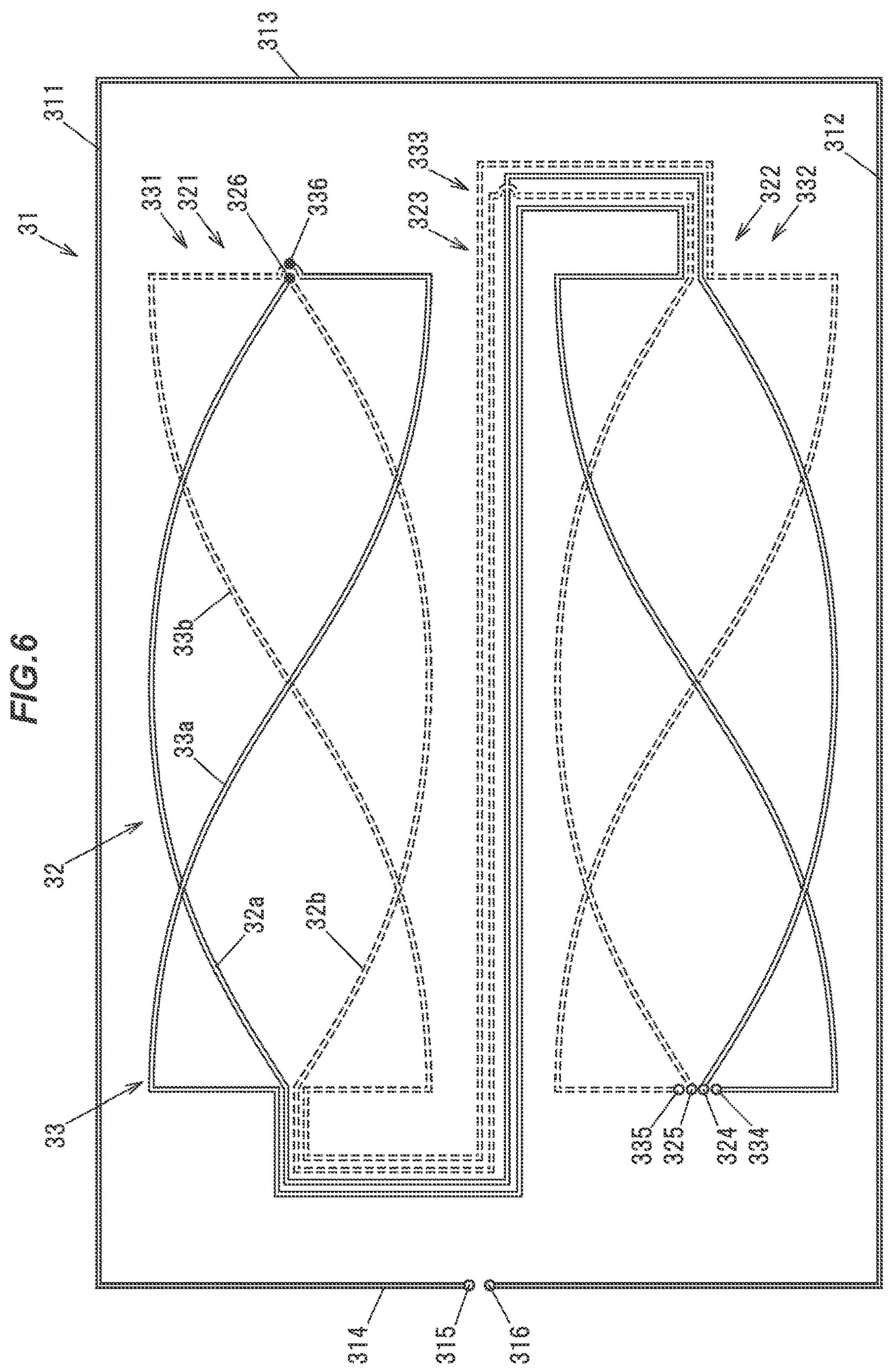
FIG. 6 is a schematic diagram showing the circuit configuration of the substrate.
Figure 7A:
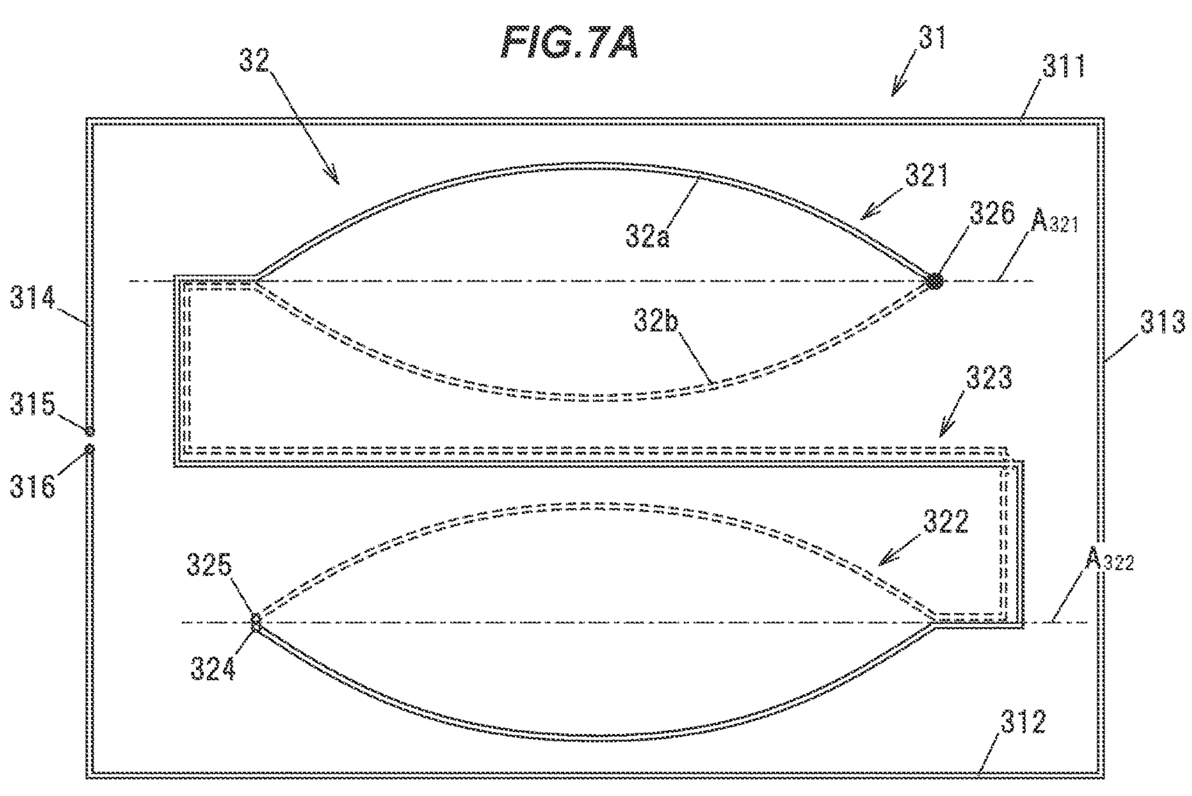
FIG. 7A and FIG. 7B are schematic diagrams showing a part of the circuit configuration of the substrate.
Figure 7B:
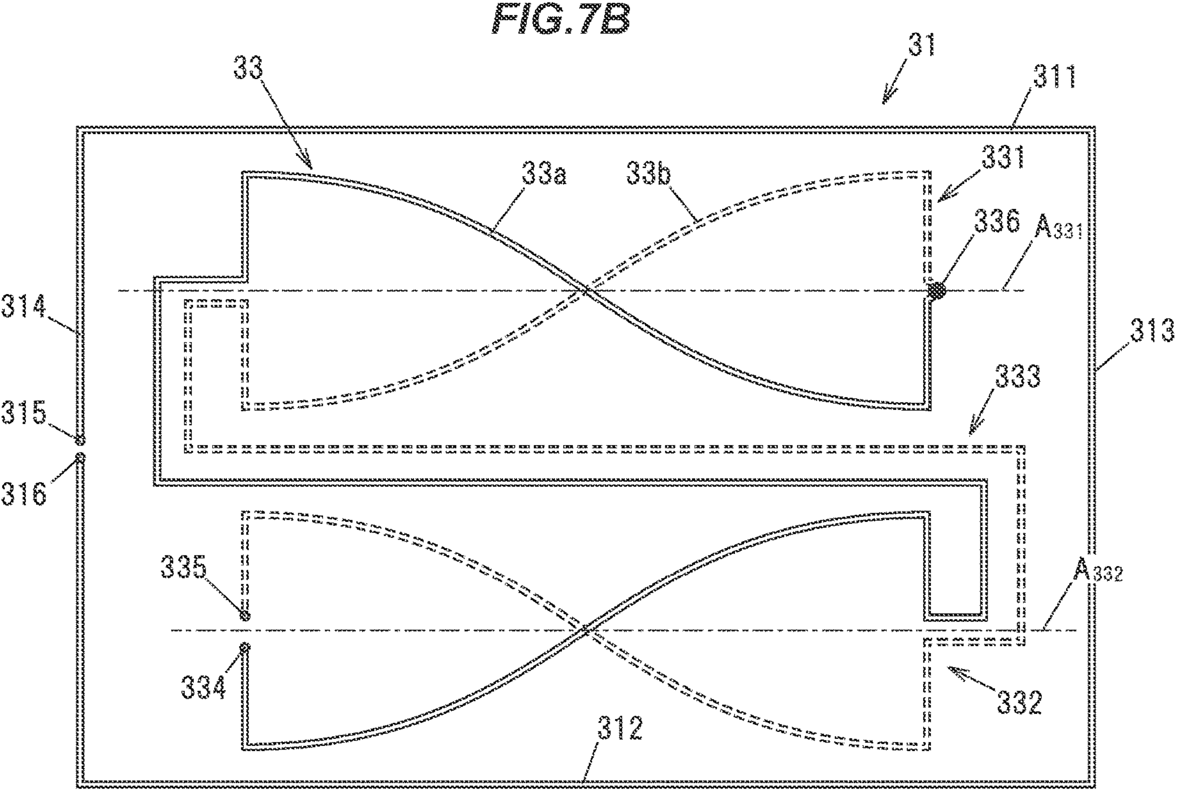

Next, the wiring configuration of the substrate 3 will be described in detail with reference to FIGS. 4A to 7B. FIG. 4A is a plan view of the front surface 3*a* showing the wiring pattern of the front surface side wiring layer 301 on the substrate 3. FIG. 4B is a plan view showing the wiring pattern of the back surface side wiring layer 302, viewed from the front surface 3*a* side. FIG. 4C is a plan view showing the wiring pattern of the front surface side wiring layer 301 overlaid with the wiring pattern of the back surface side wiring layer 302, shown in light color, as viewed from the front surface 3*a* side. FIGS. 5A to 5C are perspective views showing the wiring patterns of the front surface side wiring layer 301 and the back surface side wiring layer 302, as viewed through a base material 30. FIG. 5A shows one end of the substrate 3 in the longitudinal direction. FIG. 5B shows the center portion of the substrate 3 in the longitudinal direction. FIG. 5C shows the other end of the substrate 3 in the longitudinal direction. FIG. 6 is a schematic diagram showing the circuit configuration of the substrate 3. FIG. 7A and FIG. 7B are schematic diagrams showing a part of the circuit configuration of the substrate 3. The wiring pattern shown in each of these drawings is only an example, and various forms of wiring patterns can be employed as long as the substrate 3 is formed to obtain the effects of the invention.

On the substrate 3, an excitation coil 31 that generates an alternating magnetic field (AC magnetic field) and two detection coils 32 and 33 in which the magnetic flux of the alternating magnetic field generated by the excitation coil 31 is interlinked, are formed by wiring patterns. A power supply unit 101 supplies a sinusoidal AC current to the excitation coil 31, causing the excitation coil 31 to generate an alternating magnetic field with a frequency corresponding to the frequency of this AC current. The excitation coil 31 has a rectangular shape having a pair of long side portions 311 and 312 extending in the axial direction of the rack shaft 13 and a pair of short side portions 313 and 314 between the pair of long side portions 311 and 312. The short side portion 314 has electrodes 315, 316 for connection to the power supply unit 101. The two detection coils 32 and 33 are formed inside the excitation coil 31, and are stacked in the thickness direction of the substrate 3. Induced voltages are generated in the two detection coils 32, 33 by the alternating magnetic field generated by the excitation coil 31.

The magnetic flux of the alternating magnetic field generated by the excitation coil 31 is also interlinked with the first target portion 21 and the second target portion 22 of the target 2. The magnetic fluxes interlinked with the first and second target portions 21 and 22 affect the intensity distribution of the magnetic flux interlinked with the two detection coils 32 and 33, and the magnitude of the induced voltage generated in the two detection coils 32 and 33 by the alternating magnetic field generated by the excitation coil 31 varies depending on the position of the first target portion 21 and the second target portion 22. The phases of the voltages induced in each of the detection coils 32 and 33 during the movement of the rack shaft 13 from one axial moving end to the other axial moving end are different from each other. In the present embodiment, the phases of the voltages induced in the detection coils 32 and 33 differ by 90°. Hereafter, of the two detection coils 32 and 33, the detection coil 32 is referred to as the sine wave-shaped detection coil 32 and the detection coil 33 is referred to as the cosine wave-shaped detection coil 33.

FIG. 6 schematically shows the shapes of the excitation coil 31, the sine wave-shaped detection coil 32, and the cosine wave-shaped detection coil 33. FIG. 7A shows the shapes of the excitation coil 31 and the sine wave-shaped detection coil 32. FIG. 7B shows the shape of the excitation coil 31 and the cosine wave-shaped detection coil 33. In FIG. 6, FIG. 7A, and FIG. 7B, the width of the substrate 3 in the shortitudinal direction (vertical direction in the drawing) is shown more exaggerated than the length of the substrate 3 in the longitudinal direction (horizontal direction in the drawing).

The sine wave-shaped detection coil 32 has a first portion 321 and a second portion 322 where an induced voltage is generated when the magnetic flux of the alternating magnetic field of the excitation coil 31 is interlinked, and a connecting path 323 connecting the first portion 321 and the second portion 322. The first portion 321 and the second portion 322 of the sine wave-shaped detection coil 32 are aligned in the alignment direction along the shortitudinal direction of the substrate 3. This alignment direction (the shortitudinal direction of the substrate 3) is perpendicular to the axial direction (the longitudinal direction of the substrate 3).

Similarly, the cosine wave-shaped detection coil 33 has a first portion 331 and a second portion 332 where an induced voltage is generated when the magnetic flux of the alternating magnetic field of the excitation coil 31 is interlinked, and a connecting path 333 that connects one end of the first portion 331 in the axial direction with the other end of the second portion 332 in the axial direction. The first portion 331 and the second portion 332 of the cosine wave-shaped detection coil 33 are aligned in the alignment direction along the shortitudinal direction of the substrate 3.

The first portions 321, 331 and the second portions 322, 332 of the sine wave-shaped detection coil 32 and the cosine wave-shaped detection coil 33, respectively, extend in the axial direction. In the present embodiment, the length in the axial direction of the first portion 321 and the second portion 322 of the sine wave-shaped detection coil 32, and that of the first portions 331 and the second portion 332 of the cosine wave-shaped detection coil 33, are all the same. The first portion 321 of the sine wave-shaped detection coil 32 and the first portion 331 of the cosine wave-shaped detection coil 33 are respectively stacked in the thickness direction of the substrate 3, and the second portion 322 of the sine wave-shaped detection coil 32 and the second portion 332 of the cosine wave-shaped detection coil 33 are respectively stacked in the thickness direction of the substrate 3.

The entire first portion 321 and the entire second portion 322 of the sine wave-shaped detection coil 32 are aligned in the aforesaid alignment direction, and the entire first portion 331 and the entire second portion 332 of the cosine wave-shaped detection coil 33 are aligned in the aforesaid alignment direction. However, not limited to this, if the first portion 321 and the second portion 322 of the sine wave-shaped detection coil 32 are aligned along the shortitudinal direction of the substrate 3 at least in part, and the first portion 331 and the second portion 332 of the cosine wave-shaped detection coil 33 are aligned along the shortitudinal direction of the substrate 3 at least in part, the effect described below can be obtained.

The sine wave-shaped detection coil 32 outputs the potential of a pair of electrodes 324, 325 to the calculation unit 102. The electrodes 324, 325 are not covered with the resist film 303, and signal lines for connection with the calculation unit 102 are electrically connected by, for example, solder. The sine wave-shaped detection coil 32 is composed of a pair of conductor wires 32*a*, 32*b* connected at a turning point 326. In FIGS. 6 and 7A, one conductor wire 32*a* of the pair of conductor wires 32*a*, 32*b* is shown as a solid line and the other conductor wire 32*b* is shown as a dashed line. The turning point 326 is at the farthest distance from the electrodes 324, 325 along the pair of conductor wires 32*a*, 32*b*. The electrodes 324, 325 are the opposite ends of the pair of conductor wires 32*a*, 32*b* from the turning point 326.

The cosine wave-shaped detection coil 33 outputs the potential of a pair of electrodes 334, 335 to the calculation unit 102. The electrodes 334, 335 are not covered with the resist film 303, and signal lines for connection with the calculation unit 102 are electrically connected by, for example, solder. The cosine wave-shaped detection coil 33 is composed of a pair of conductor wires 33*a*, 33*b* connected at a turning point 336. In FIGS. 6 and 7B, one conductor wire 33*a* of the pair of conductor wires 33*a*, 33*b* is shown as a solid line and the other conductor wire 33*b* is shown as a dashed line. The turning point 336 is at the farthest distance from the electrodes 334, 335 along the pair of conductor wires 33*a*, 33*b*. The electrodes 334, 335 are the opposite ends of the pair of conductor wires 33*a*, 33*b* from the turning point 336.

The first portion 321 and the second portion 322 of the sine wave-shaped detection coil 32 are a combination of a pair of conductor wires 32*a*, 32*b* whose shape, viewed from the thickness direction of the substrate 3, is symmetrical across the symmetry axes $A_{321}$, $A_{322}$ that extends in the axial direction. In the connecting path 323, the pair of conductor wires 32*a*, 32*b* traverse between the first portion 321 and the second portion 322 along the longitudinal direction of the substrate 3. In the first portion 321, one conductor wire 32*a* is farther from the connecting path 323 than the other conductor wire 32*b* in the shortitudinal direction of the substrate 3. In the second portion 322, one conductor wire 32*a* is farther from the connecting path 323 than the other conductor wire 32*b*. In other words, in the sine wave-shaped detection coil 32, the arrangement of the pair of conductor wires 32*a* and 32*b* with respect to the symmetry axes $A_{321}$, $A_{322}$ is opposite in the first portion 321 and the second portion 322. The conductor wires 32*a*, 32*b* in the connecting path 323 overlap in the thickness direction of the substrate 3 as shown in FIG. 4 so that no induced voltage is generated by the alternating magnetic field generated by the excitation coil 31.

Similarly, the first portion 331 and the second portion 332 of the cosine wave-shaped detection coil 33 are a combination of a pair of conductor wires 33*a*, 33*b* whose shape, viewed from the thickness direction of the substrate 3, is symmetrical across the symmetry axes $A_{331}$, $A_{332}$ that extends in the axial direction. In the connecting path 333, the pair of conductor wires 33*a*, 33*b* traverse between the first portion 331 and the second portion 332 along the longitudinal direction of the substrate 3. In the first portion 331, one conductor wire 33*a* is located far from the connecting path 333 at the one end in the axial direction, which is the left side of the drawing, and the other conductor wire 33*b* is located close to the connecting path 333. At the other end in the axial direction in the first portion 331, the position of one conductor wire 33*a* and the other conductor wire 33*b* is the opposite of this. In the second portion 332, at the one end in the axial direction, one conductor wire 33*a* is located far from the connecting path 333 and the other conductor wire 33*b* is located close to the connecting path 333. At the other end of the axial direction in the second portion 332, the position of one conductor wire 33*a* and the other conductor wire 33*b* is the opposite of this. In other words, the cosine wave-shaped detection coil 33 has the opposite arrangement of the pair of conductor wires 32*a* and 32*b* with respect to the symmetry axes $A_{331}$, $A_{332}$ in the first portion 331 and the second portion 332. The conductor wires 33*a*, 33*b* in the connecting path 333 overlap in the thickness direction of the substrate 3 as shown in FIG. 4 so that no induced voltage is generated by the alternating magnetic field generated by the excitation coil 31.

The pair of conductor wires 32*a*, 32*b* of the sine wave-shaped detection coil 32 and the pair of conductor wires 33*a*, 33*b* of the cosine wave-shaped detection coil 33 are sinusoidal in shape, respectively. More specifically, one conductor wire 32*a* of the sine wave-shaped detection coil 32 has a sine wave shape in the range from 0° to 180° when the symmetry axis $A_{321}$ is regarded as the phase axis in the first portion 321, and in the range from 180° to 360° when the symmetry axis line $A_{322}$ is regarded as the phase axis in the second portion 322. The other conductor wire 32*b* of the sine wave-shaped detection coil 32 has a sine wave shape in the range from 180° to 360° when the symmetry axis line $A_{321}$ is regarded as the phase axis in the first portion 321, and in the range from 0° to 180° when the symmetry axis line $A_{322}$ is regarded as the phase axis in the second portion 322. One conductor wire 33*a* of the cosine wave-shaped detection coil 33 has a sine wave shape in the range from 90° to 270° when the symmetry axis $A_{331}$ is regarded as the phase axis in the first portion 331, and in the range from 270° to 360° and 0° to 90° when the symmetry axis line $A_{332}$ is regarded as the phase axis in the second portion 332. The other conductor wire 33*b* of the cosine wave-shaped detection coil 33 has a sine wave shape in the range from 270° to 360° and 0° to 90° when the symmetry axis line $A_{331}$ is regarded as the phase axis in the first portion 331, and in the range from 90° to 270° when the symmetry axis line $A_{332}$ is regarded as the phase axis in the second portion 332.

The shape of one conductor wire 33*a* of the cosine wave-shaped detection coil 33 can be described as a cosine wave shape in the range from 0° to 180° when the symmetry axis $A_{331}$ is regarded as the phase axis in the first portion 331, and in the range from 180° to 360° when the symmetry axis $A_{332}$ is regarded as the phase axis in the second portion 332. The shape of the other conductor wire 33*b* of the cosine wave-shaped detection coil 33 can be described as a cosine wave shape in the range from 180° to 360° when the symmetry axis $A_{331}$ is regarded as the phase axis in the first portion 331, and in the range from 0° to 180° when the symmetry axis $A_{332}$ is regarded as the phase axis in the second portion 332.

While the rack shaft 13 moves from one axial moving end to the other axial moving end, the first target portion 21 faces the first portion 321 of the sine wave-shaped detection coil 32 and the first portion 331 of the cosine wave-shaped detection coil 33, and the second target portion 22 face the second portion 322 of the sine wave-shaped detection coil 32 and the second portion 332 of the cosine wave-shaped detection coil 33. The induced voltages generated in the first portion 321 of the sine wave-shaped detection coil 32 and in the first portion 331 of the cosine wave-shaped detection coil 33 vary with the position of the first target portion 21 relative to the first portions 321 and 331. The induced voltages generated in the second portion 322 of the sine wave-shaped detection coil 32 and in the second portion 332 of the cosine wave-shaped detection coil 33 vary with the position of the second target portion 22 relative to the second portions 322 and 332.

In FIG. 4C, the position and size of the first target portion 21 and the second target portion 22 with respect to the substrate 3 when the rack shaft 13 is in the neutral position are indicated by dashed lines. In FIG. 4C, the overlap length, which is the axial length of the range where the first portions 321, 331 of the sine wave-shaped detection coil 32 and the cosine wave-shaped detection coil 33 and the first target portion 21 overlap in the direction perpendicular to the substrate 3, is shown by $L_1$, and the overlap length of the second portions 322, 332 of the sine wave-shaped detection coil 32 and the cosine wave-shaped detection coil 33 and the second target portion 22 overlap in the direction perpendicular to the substrate 3, is shown, is indicated by $L_2$. In the target 2, the first target portion 21 and the second target portion 22 are axially offset so that the total length, which is the sum of $L_1$ and $L_2$, is always constant.

When the first target portion 21 is axially displaced from the range in which the sine wave-shaped detection coil 32 and the cosine wave-shaped detection coil 33 are formed, $L_1$ becomes 0. When the second target portion 22 is axially displaced from the range in which the sine wave-shaped detection coil 32 and the cosine wave-shaped detection coil 33 are formed, $L_2$ becomes 0. The axial length $L_{21}$ of the first target portion 21 is the same as the axial length $L_{22}$ of the second target portion 22, and the total length of $L_1$ and $L_2$ is the same as the axial length $L_{21}$ of the first target portion 21 and the axial length $L_{22}$ of the second target portion 22. The axial length $L_{21}$ of the first target portion 21 and the axial length $L_{22}$ of the second target portion 22 are, as an example, equal to or less than half of the axial lengths of the first portions 321, 331 and the second portions 322, 332 of the sine wave-shaped detection coil 32 and the cosine wave-shaped detection coil 33.

When the first target portion 21 and the second target portion 22 are made of a material with higher magnetic permeability than that of the rack shaft 13, the magnetic flux concentrates and flows in the first target portion 21 and the second target portion 22, and the magnetic flux density in a part of the substrate 3 facing the first target portion 21 and the second target portion 22 is higher than that in other parts. Additionally, when the first target portion 21 and the second target portion 22 are made of a material with higher conductivity than that of the rack shaft 13, an eddy current is generated in the first target portion 21 and the second target portion 22 by the alternating magnetic field. This reduces the density of the magnetic flux interlinked with the sine wave-shaped detection coil 32 and the cosine wave-shaped detection coil 33, thus the magnetic flux density in the part of the substrate 3 that faces the first target portion 21 and the second target portion 22 becomes lower than that in other parts. Therefore, the magnitude of the voltage induced in the sine wave-shaped detection coil 32 and the cosine wave-shaped detection coil 33 varies according to the position of the first target portion 21 and the second target portion 22 with respect to the substrate 3.

A voltage with the same period as the period of the AC current supplied to the excitation coil 31 is induced in the sine wave-shaped detection coil 32 and the cosine wave-shaped detection coil 33, and the peak value of the induced voltage varies according to the position of the first target portion 21 and the second target portion 22. The peak value of the voltage here refers to the maximum value of the absolute value of the voltage within a period of one cycle of the alternating current supplied to the excitation coil 31.

The peak values of the voltages induced in the sine wave-shaped detection coil 32 and the cosine wave-shaped detection coil 33 vary within a range of one cycle or less, while the rack shaft 13 moves from one axial moving end to the other axial moving end. This enables the stroke sensor 1 to detect the absolute position of the rack shaft 13 over the entire range $R_1$ in which the rack shaft 13 can move in the axial direction.

(Operation of Stroke Sensor 1)

Next, the operation of the stroke sensor 1 for detecting the position of the target 2 with respect to the substrate 3 will be explained with reference to FIGS. 8 to 10. In the following description, the position of the target 2 refers to the position of the center point of the first target portion 21 in the axial direction.

Figure 8:
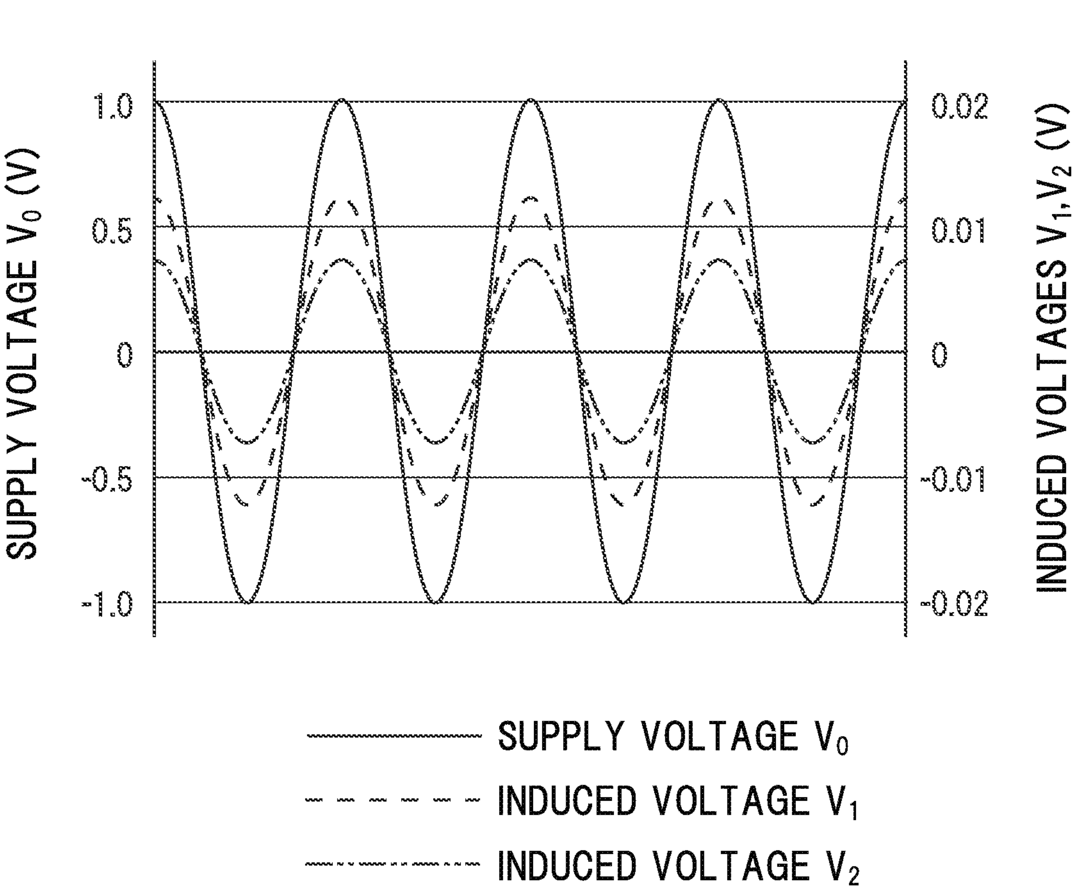
FIG. 8 is a graph showing an example of the relationship between a supply voltage supplied to the excitation coil and the induced voltage induced in a sine wave-shaped detection coil and a cosine wave-shaped detection coil.

FIG. 8 is a graph showing an example of the relationship between the supply voltage $V_0$ supplied to the excitation coil 31, the induced voltage $V_1$ induced in the sine wave-shaped detection coil 32, and the induced voltage $V_2$ induced in the cosine wave-shaped detection coil 33, when the first target portion 21 overlaps the first portions 321 and 331 of the sine wave-shaped detection coil 32 and the cosine wave-shaped detection coil 33. The horizontal axis of the graph in FIG. 8 represents time, and the supply voltage $V_0$ and the induced voltages $V_1$ and $V_2$ are shown in the vertical axes on the left and on the right respectively.

In the example shown in FIG. 8, the supply voltage $V_0$ and the induced voltages $V_1$ and $V_2$ are in the same phase. When the second target portion 22 overlaps the second portions 322, 332 of the sine wave-shaped detection coil 32 and the cosine wave-shaped detection coil 33, the induced voltage $V_1$ induced in the sine wave-shaped detection coil 32 is the opposite phase (out of phase) with the supply voltage $V_0$ supplied to the excitation coil 31. The induced voltage $V_2$ induced in the cosine wave-shaped detection coil 33 switches between the same phase (in phase) and the opposite phase (out of phase) each time the first or second target portion 21 or 22 passes through the position where one conductor wire 33*a* and the other conductor wire 33*b* cross. A high-frequency AC voltage of about 1 MHz to 1 GHz, for example, is supplied to the excitation coil 31 as the supply voltage $V_0$.

Figure 9:
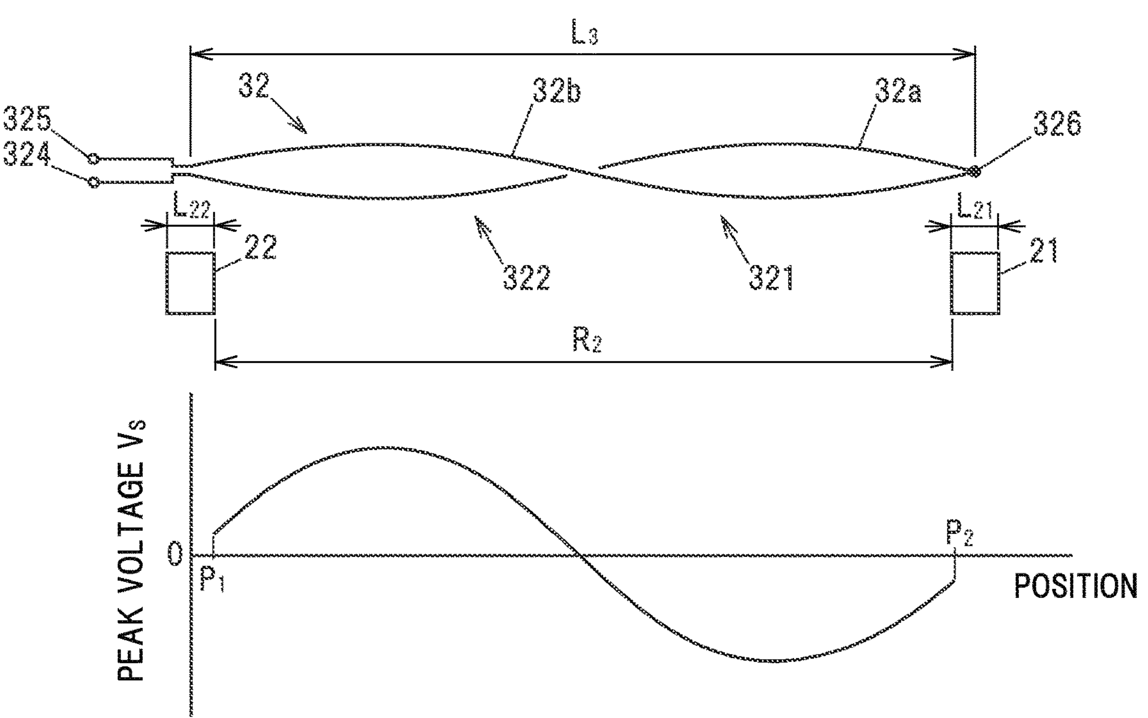
FIG. 9 is a graph showing the relationship between the peak voltage, which is a peak value of the induced voltage induced in the sine wave-shaped detection coil, and the position of the target.

FIG. 9 is a graph showing the relationship between the peak voltage $V_S$ which is the peak value of the induced voltage $V_1$ induced in the sine wave-shaped detection coil 32, and the position of the target 2. FIG. 10 is a graph showing the relationship between the peak voltage $V_C$ which is the peak value of the induced voltage $V_2$ induced in the cosine wave-shaped detection coil 33, and the position of the target 2. The horizontal axis of the graphs shown in FIGS. 9 and 10 indicates the position of the target 2. In FIGS. 9 and 10, the connecting paths 323, 333 are omitted and the first portions 321, 331 and the second portions 322, 332 are aligned in the left-right direction of the drawing.

The stroke sensor 1 can detect the absolute position of the target 2 in the axial range $R_2$ where the total length of $L_1$ and $L_2$ is constant. The graphs in FIGS. 9 and 10 show the peak voltages $V_S$ and $V_C$ at each position, with $P_1$ as the abscissa coordinate when the target 2 is at one end of the axial range $R_2$ and $P_2$ as the abscissa coordinate when the target 2 is at the other end of the axial range $R_2$. The length of the axial range $R_2$ is equal to or greater than the range $R_1$ over which the rack shaft 13 can move in the axial direction.

Figure 10:
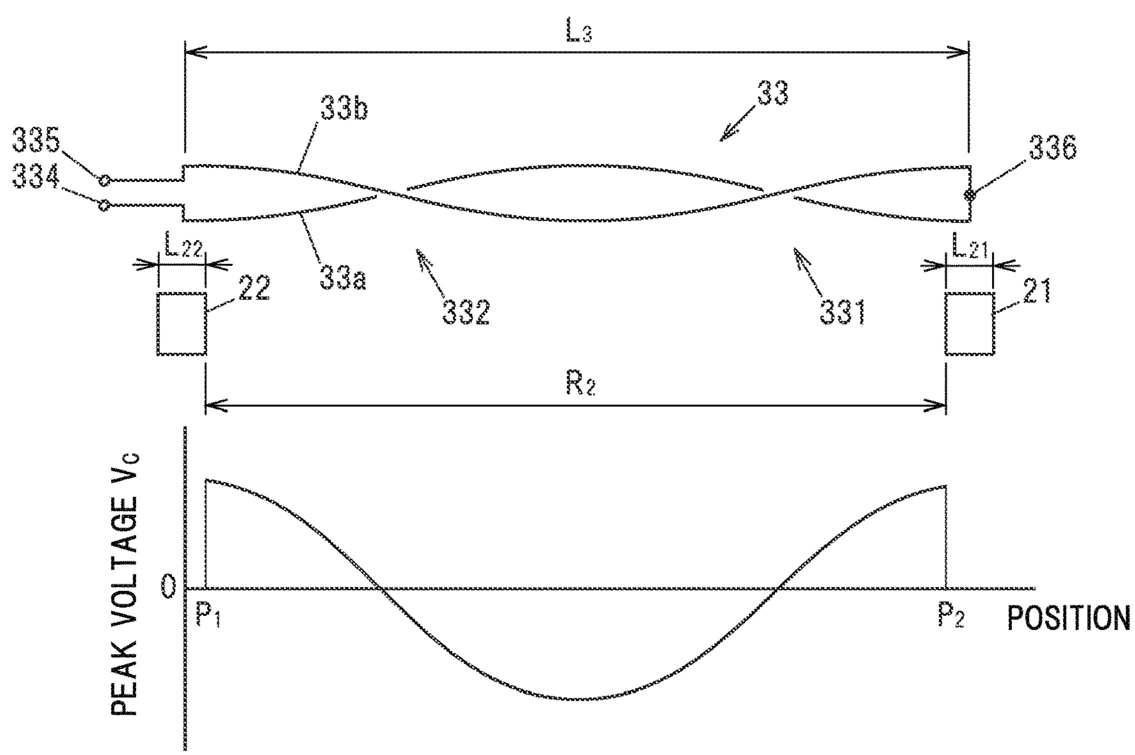
FIG. 10 is a graph showing the relationship between the peak voltage, which is a peak value of the induced voltage induced in the cosine wave-shaped detection coil, and the position of the target.

Further, in the graphs shown in FIGS. 9 and 10, the peak voltage $V_S$ of the sine wave-shaped detection coil 32 is positive when the induced voltage $V_1$ induced in the sine wave-shaped detection coil 32 is in phase with the voltage $V_0$ supplied to the excitation coil 31 and negative when it is in the opposite phase. Similarly, the peak voltage $V_C$ of the cosine wave-shaped detection coil 33 shall be positive when the induced voltage $V_2$ induced in the cosine wave-shaped detection coil 33 is in phase with the voltage $V_0$ supplied to the excitation coil 31, and negative when it is in the opposite phase.

If ωx is defined as in Formula [1], the peak voltages $V_S$ and $V_C$ are obtained by Formulas [2] and [3], respectively, using Xp as the coordinate value of the abscissa coordinate of the target 2 in the graphs shown in FIGS. 9 and 10. In Formulas [2] and [3], A is a predetermined constant and L is one-half the axial length of the first and second target portions 21 and 22 ($L=L_{21}/2$, $L_{22}/2$).

[Formula 1]

$$\omega_x = \frac{2\pi}{L_3} \quad [1]$$

[Formula 2]

$$V_S = A\ \sin\{\omega_x(X_p - L)\} \quad [2]$$

[Formula 3]

$$V_C = A\ \cos\{\omega_x(X_p - L)\} \quad [3]$$

Based on Formula [2] and Formula [3], the coordinate value Xp of the target 2 in the graphs shown in FIGS. 9 and 10 can be obtained by Formula [4]. In other words, the calculation unit 102 can calculate the position of the target 2 based on the peak voltages $V_S$ and $V_C$.

[Formula 4]

$$X_p = \frac{\arctan\left(\frac{V_S}{V_C}\right)}{\omega_x} + L \quad [4]$$

By the way, if the rack shaft 13 is inclined with respect to the substrate 3 due to vibrations caused by vehicle running and the distance between the substrate 3 and the rack shaft 13 changes, for example, the degree to which the rack shaft 13 affects the intensity distribution of the magnetic flux inside the excitation coil 31 changes depending on the position of the substrate 3 in the longitudinal direction. In the present embodiment, the effect of the inclination of the rack shaft 13 on the detection accuracy of the position of the target 2 is suppressed by the configuration in which the first portions 321 and 331 and the second portions 322 and 332 of the sine wave-shaped detection coil 32 and cosine wave-shaped detection coil 33 are aligned in the shortitudinal direction of the substrate 3. Next, the action and effect of this configuration will be explained by comparing with a comparative example.

Figure 11A:
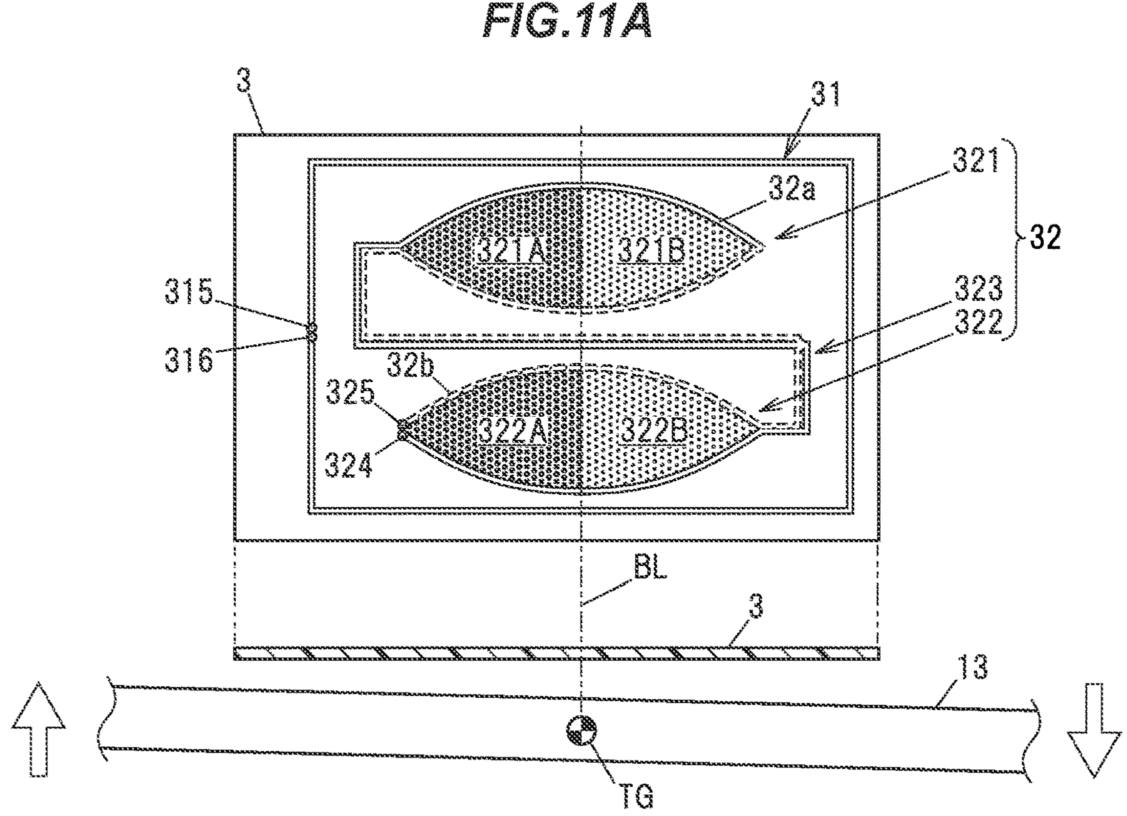
FIG. 11A is an explanatory diagram schematically showing the relationship between the inclination of the rack shaft with respect to the substrate and the effect of the inclination of the rack shaft on the magnetic flux density interlinked with the sine wave-shaped detection coil.
Figure 11B:
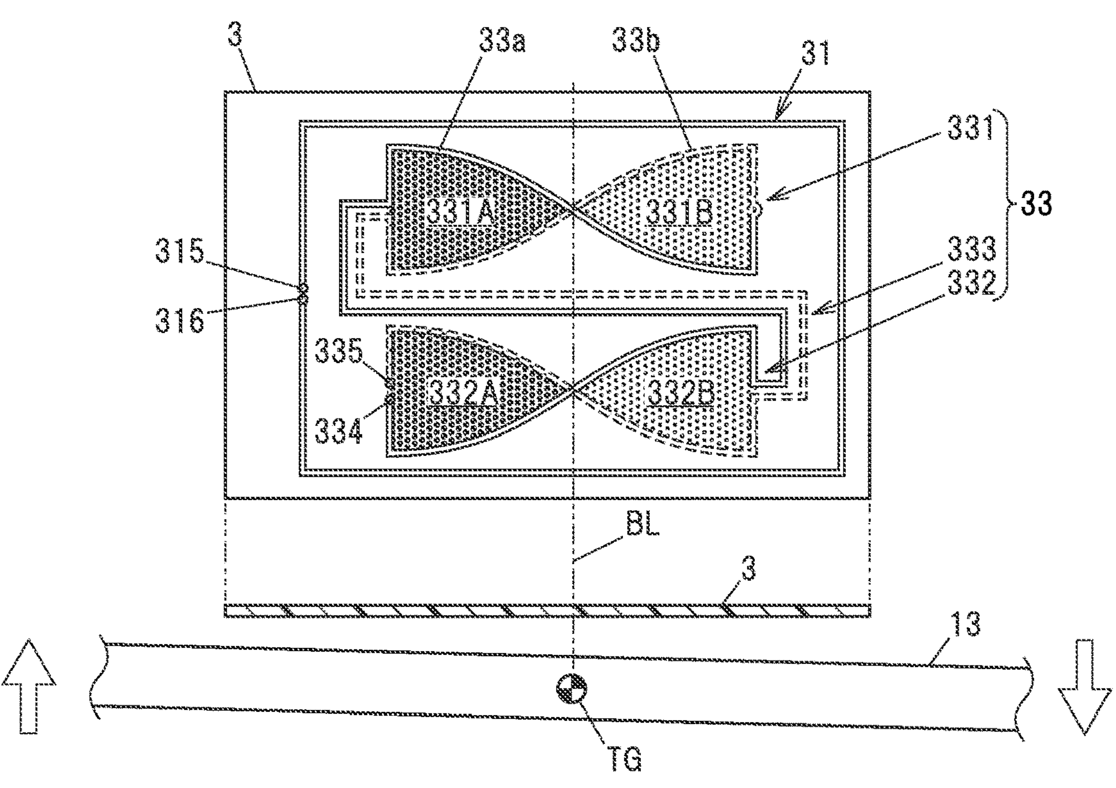
FIG. 11B is an explanatory diagram schematically showing the relationship between the inclination of the rack shaft with respect to the substrate and the effect of the inclination of the rack shaft on the magnetic flux density interlinked with the cosine wave-shaped detection coil.

FIG. 11A is an explanatory diagram schematically showing the relationship between the inclination of the rack shaft 13 with respect to the substrate 3 and the effect of the inclination of the rack shaft 13 on the magnetic flux density interlinked with the sine wave-shaped detection coil 32. FIG. 11B is an explanatory diagram schematically showing the relationship between the inclination of rack shaft 13 with respect to the substrate 3 and the effect of the inclination of rack shaft 13 on the magnetic flux density interlinked with the cosine wave-shaped detection coil 33. In FIGS. 11A and 11B, a bisecting line BL of the first portions 321 and 331 and the second portions 322 and 332 of the sine wave-shaped detection coil 32 and the cosine wave-shaped detection coil 33 is shown in dash double-dot line, and the rack shaft 13 is inclined in the vertical direction in the drawing around the point indicated by a target mark TG on the bisecting line BL. The rack shaft 13 is inclined so that the portion to the left of the target mark TG is closer to the substrate 3 and the portion to the right of the target mark TG is further away from the substrate 3. In FIGS. 11A and 11B, the inclination of rack shaft 13 is shown in an exaggerated manner.

Eddy currents flow in the rack shaft 13 due to interlinking of the magnetic flux of the alternating magnetic field generated by the excitation coil 31. These eddy currents act to weaken the magnetic flux interlinked with the sine wave-shaped detection coil 32 and the cosine wave-shaped detection coil 33. The effect of this action is greater in areas where the distance between the rack shaft 13 and the substrate 3 is closer. In FIGS. 11A and 11B, the areas inside the sine wave-shaped detection coil 32 and the cosine wave-shaped detection coil 33, where this effect is increased by the inclination of the rack shaft 13, are shown in dark gray, and the areas inside the sine wave-shaped detection coil 32 and the cosine wave-shaped detection coil 33, where this effect is reduced by the inclination of the rack shaft 13, are shown in light gray.

As shown in FIG. 11A, in a first left portion 321A and a second left portion 322A that are located to the left of the bisecting line BL in the first portion 321 and the second portion 322 of the sine wave-shaped detection coil 32, when the rack shaft 13 is inclined as in the drawing, the effect of eddy currents generated in the rack shaft 13 increases and the magnetic flux density becomes lower. In a first right portion 321B and a second right portion 322B that are located to the right of the bisecting line BL in the first portion 321 and the second portion 322 of the sine wave-shaped detection coil 32, when the rack shaft 13 is inclined as in the drawing, the effect of eddy currents generated in the rack shaft 13 decreases and the magnetic flux density becomes higher. However, the effect of the decrease in magnetic flux density of the first left portion 321A on the induced voltage $V_1$ and the effect of the increase in magnetic flux density of the first right portion 321B on the induced voltage $V_1$ are offset. Also, the effect of the decrease in the magnetic flux density of the second left portion 322A on the induced voltage $V_1$ and the effect of the increase in the magnetic flux density of the second right portion 322B on the induced voltage $V_1$ are offset. Therefore, when the rack shaft 13 is inclined with respect to the substrate 3, the induced voltage $V_1$ is not varied.

As shown in FIG. 11B, in the first left portion 331A and second left portion 332A that are located to the left of the bisecting line BL in the first portion 331 and the second portion 332 of the cosine wave-shaped detection coil 33, when the rack shaft 13 is inclined as in the drawing, the effect of eddy currents generated in the rack shaft 13 increases and the magnetic flux density becomes lower. In a first right portion 331B and a second right portion 332B that are located to the right of the bisecting line BL in the first portion 331 and the second portion 332 of the cosine wave-shaped detection coil 33, when the rack shaft 13 is inclined as in the drawing, the effect of eddy currents generated in the rack shaft 13 decreases and the magnetic flux density becomes higher. However, the effect of the decrease in magnetic flux density of the first left portion 331A on the induced voltage $V_2$ and the effect of the increase in magnetic flux density of the second right portion 332B on the induced voltage $V_2$ are offset. Also, the effect of the decrease in the magnetic flux density of the second left portion 332A on the induced voltage $V_2$ and the effect of the increase in the magnetic flux density of the first right portion 331B on the induced voltage $V_2$ are offset. This means that when the rack shaft 13 is inclined with respect to the substrate 3, the induced voltage $V_2$ is not varied.

As explained above, in the present embodiment, neither the induced voltage $V_1$ nor the induced voltage $V_2$ is varied when the rack shaft 13 is inclined with respect to the substrate 3. This makes it possible to detect the position of the rack shaft 13 with high accuracy in the present embodiment. Additionally, in the present embodiment, when the rack shaft 13 is in the neutral position, the first target portion 21 faces the center of the first portions 321 and 331 of the sine wave-shaped detection coil 32 and the cosine wave-shaped detection coil 33 in the coil longitudinal direction. Therefore, the position of the target 2 near the neutral position can be detected more accurately, for example, than a case where the first target portion 21 faces the ends of the first portions 321 and 331 of the sine wave-shaped detection coil 32 and the cosine wave-shaped detection coil 33 when the rack shaft 13 is in the neutral position. This is because it is less susceptible to dimensional errors in the axial distance between the first and second target portions 21 and 22 and to the effects of overlapping wiring patterns at the ends of the first portions 321 and 331 of the sine wave-shaped detection coil 32 and the cosine wave-shaped detection coil 33.

Figure 12A:
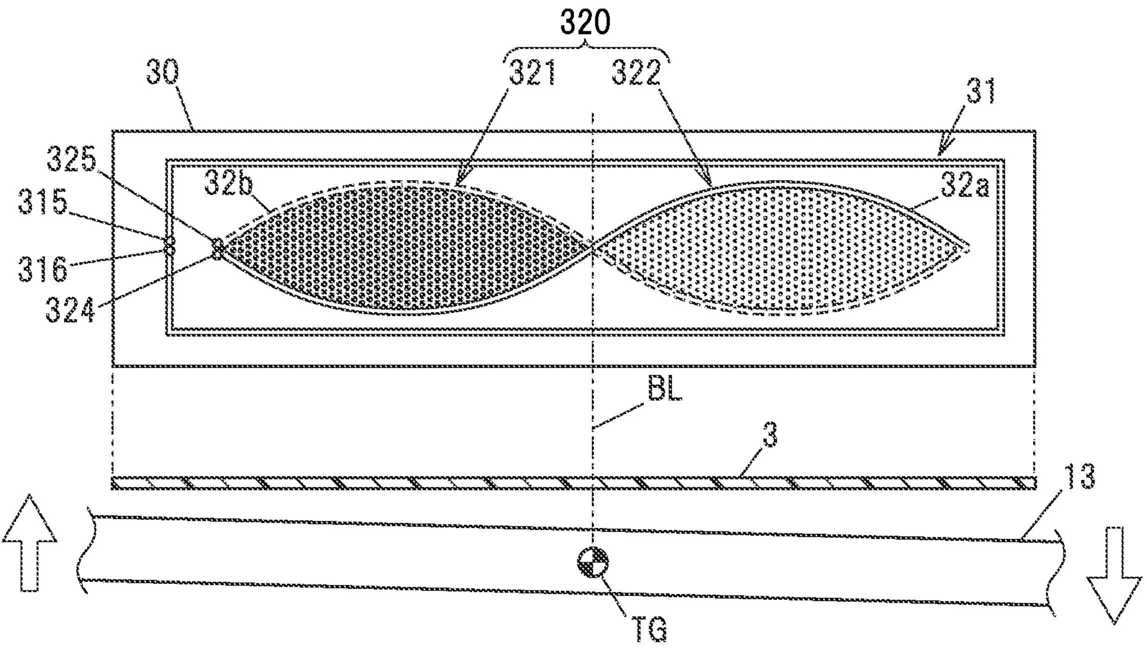
FIG. 12A is an explanatory diagram schematically showing the relationship between the inclination of the rack shaft with respect to the substrate and the effect of the inclination of the rack shaft on the magnetic flux density interlinked with the sine wave-shaped detection coil according to the comparative example.
Figure 12B:
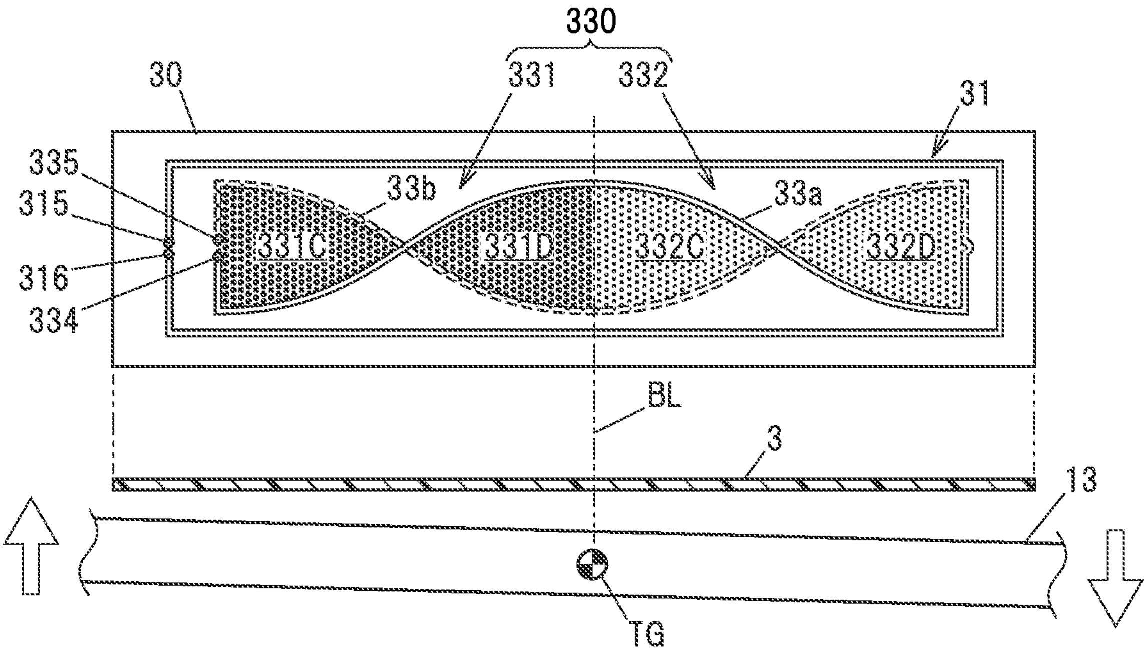
FIG. 12B is an explanatory diagram schematically showing the relationship between the inclination of the rack shaft with respect to the substrate and the effect of the inclination of the rack shaft on the magnetic flux density interlinked with the cosine wave-shaped detection coil according to the comparative example.

FIG. 12A is an explanatory diagram schematically showing the relationship between the inclination of the rack shaft 13 with respect to the substrate 3 and the effect of the inclination of the rack shaft 13 on the magnetic flux density interlinked with a sine wave-shaped detection coil 320 according to a comparative example. FIG. 12B is an explanatory diagram schematically showing the relationship between the inclination of rack shaft 13 with respect to the substrate 3 and the effect of the inclination of the rack shaft 13 on the magnetic flux density interlinked with a cosine wave-shaped detection coil 330 according to the comparative example.

The sine wave-shaped detection coil 320 according to the comparative example has the first portion 321 and the second portion 322 formed by a pair of conductor wires 32*a* and 32*b* as the sine wave-shaped detection coil 32 according to the embodiment described above. However, it does not have the connecting path 323, and the first portion 321 and the second portion 322 are aligned along the axial direction of the rack shaft 13 with the bisecting line BL between them. Also, the cosine wave-shaped detection coil 330 according to the comparative example has, the first portion 331 and the second portion 332 formed by a pair of conductor wires 33*a* and 33*b* as the cosine wave-shaped detection coil 33 according to the embodiment described above. However, it does not have the connecting path 333, and the first portion 331 and the second portion 332 are aligned along the axial direction of the rack shaft 13 with the bisecting line BL between them.

In the sine wave-shaped detection coil 320 according to the comparative example, when the rack shaft 13 is inclined as shown in the drawing., the effect of eddy currents generated in the rack shaft 13 increases and the magnetic flux density becomes low in the first portion 321, while the effect of eddy currents generated in the rack shaft 13 decreases and the magnetic flux density becomes higher in the second portion 322. However, since the alignment of the pair of conductor wires 32*a* and 32*b* in the shortitudinal direction of the substrate 3 is opposite in the first and second portions 321 and 322, the effect of the lower magnetic flux density in the first portion 321 and the effect of the higher magnetic flux density in the second portion 322 are not offset, and thus the inclination of the rack shaft 13 fluctuates the peak value of the induced voltage $V_1$. For this reason, when the sine wave-shaped detection coil 320 according to the comparative example is used, an error may occur in the detection position of the rack shaft 13.

In the cosine wave-shaped detection coil 330 according to the comparative example, when each of the areas inside the cosine wave-shaped detection coil 330 is designated as the first left portion 331C, the first right portion 331D, the second left portion 332C, and the second right portion 332D as shown in FIG. 12B, the effect of the inclination of the rack shaft 13 on the magnetic flux of the first left portion 331C and the effect of the inclination of the rack shaft 13 on the magnetic flux of the second right portion 332D are offset, and the effect of the inclination of the rack shaft 13 on the magnetic flux of the first right portion 331D and the effect of the inclination of the rack shaft 13 on the magnetic flux of the second left portion 332C are offset, and thus, when the rack shaft 13 is inclined with respect to the substrate 3, the induced voltage $V_2$ is not varied.

Modified Example

Figure 13:
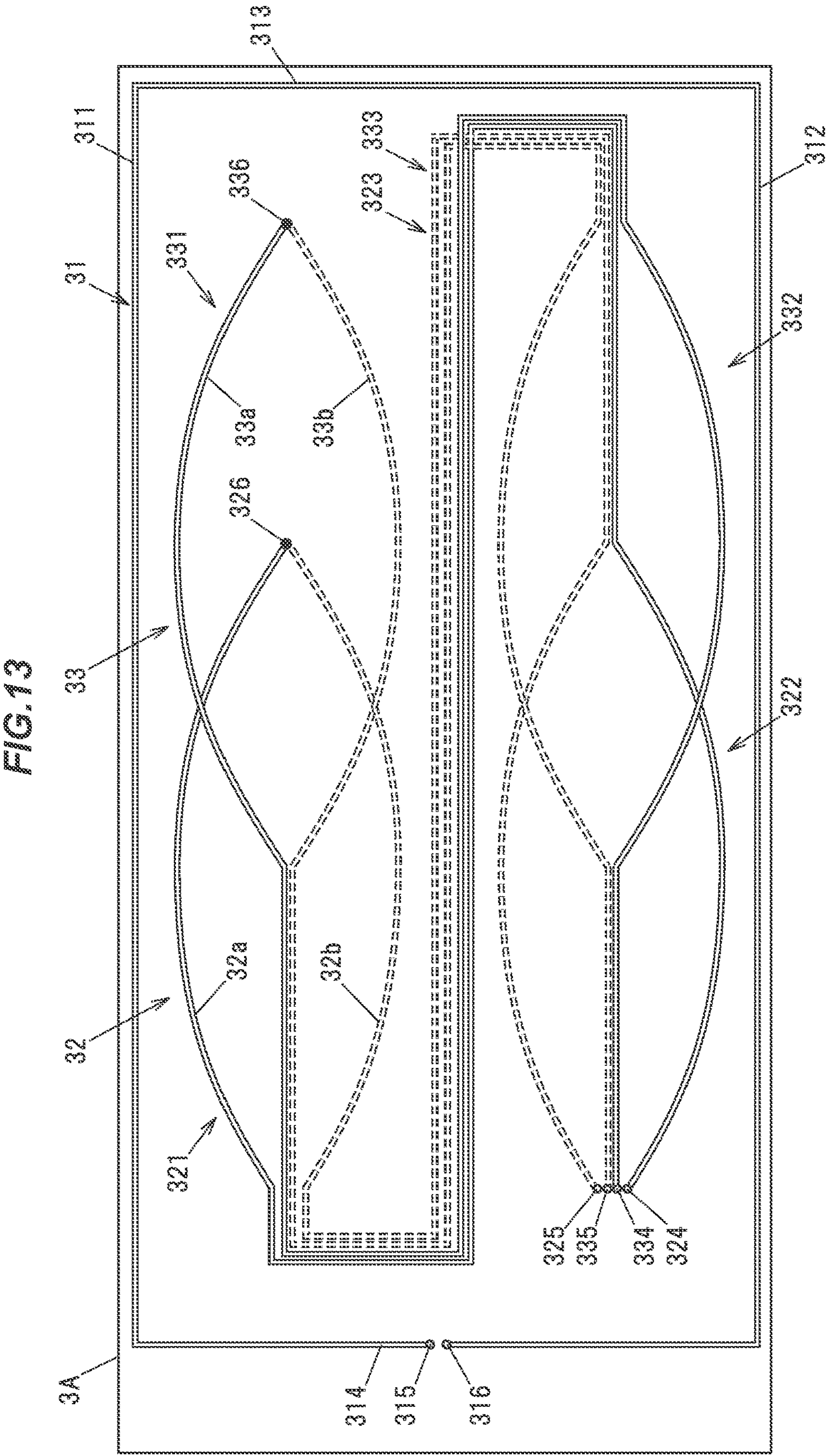
FIG. 13 is a schematic diagram of the circuit configuration of a substrate with an excitation coil and two detection coils in a modified example of the first embodiment.

FIG. 13 shows a schematic diagram of the circuit configuration of a substrate 3A with an excitation coil 31 and two detection coils 32, 33 in a modified example of the embodiment. In the above embodiment, the case where the shapes of the first portion 321 and the second portion 322 of one of the two detection coils 32, 33 (sine wave-shaped detection coil 32) and the shapes of the first portion 331 and the second portion 332 of the other detection coil 33 (cosine wave-shaped detection coil 33) differ, and the entire first and second portions 321 and 322 of the sine wave-shaped detection coil 32 and the entire first and second portions 331 and 332 of the cosine wave-shaped detection coil 33 are aligned in the shortitudinal direction of the substrate 3 was described. In this modified example, of the two detection coils 32, 33, the shapes of the first and second portions 321 and 322 of one detection coil 32 and the first and second portions 331 and 332 of the other detection coil 33 are the same, and respective axial portions of the first portion 321 of one detection coil 32 and the first portion 331 of the other detection coil 33 are partially aligned in the shortitudinal direction of the substrate, and respective axial portions of the second portion 322 of one detection coil 32 and the second portion 332 of the other detection coil 33 are partially aligned in the shortitudinal direction of the substrate 3.

This modified example also mitigates the effect of the inclination of the rack shaft 13 on the induced voltages $V_1$, $V_2$ compared to the comparative example shown in FIGS. 12A and 12B, and enables the position of the rack shaft 13 to be detected with high accuracy.

Second Embodiment

Next, with reference to FIGS. 14A to 18D, we will explain a substrate 4 in the second embodiment of the invention. In the first embodiment, the case where the substrate 3 is a two-layer substrate having a front surface side wiring layer 301 and a back surface side wiring layer 302 is described, while in the second embodiment, the substrate 4 is a four-layer substrate having a first wiring layer 401, a second wiring layer 402, a third wiring layer 403, and a fourth wiring layer 404. The first wiring layer 401 and the fourth wiring layer 404 are the outer layers of the substrate 4, while the second wiring layer 402 and the third wiring layer 403 are the inner layers of the substrate 4. The substrate 4, like the substrate 3 in the first embodiment, is rectangular in shape with the axial direction of the rack shaft 13 being the longitudinal direction.

Figures 14A, 14B, 14C, 14D, 14E:
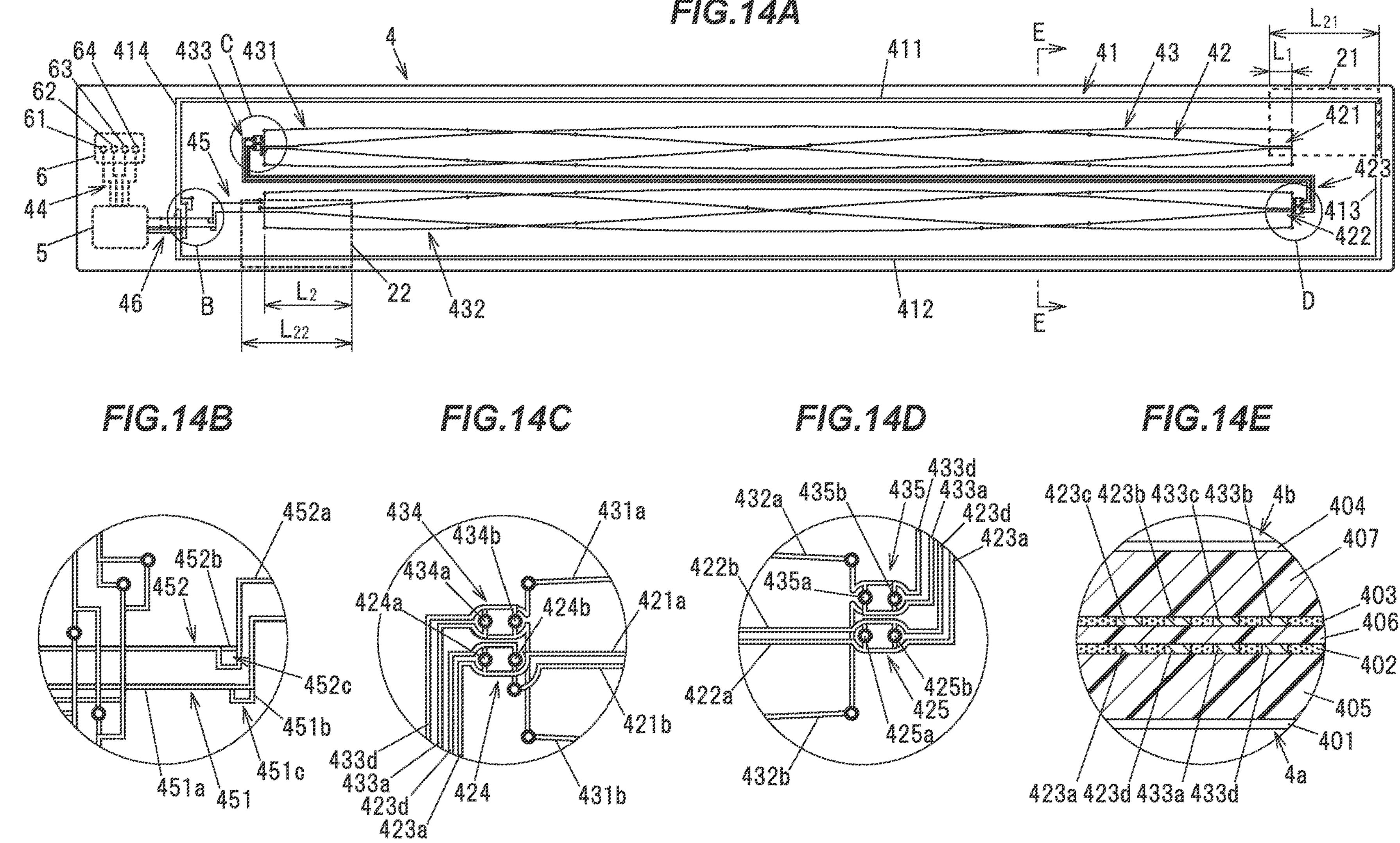
FIGS. 14A to 14E are explanatory diagrams showing a configuration of a substrate in the second embodiment.
Figures 15A, 15B, 15C, 15D:
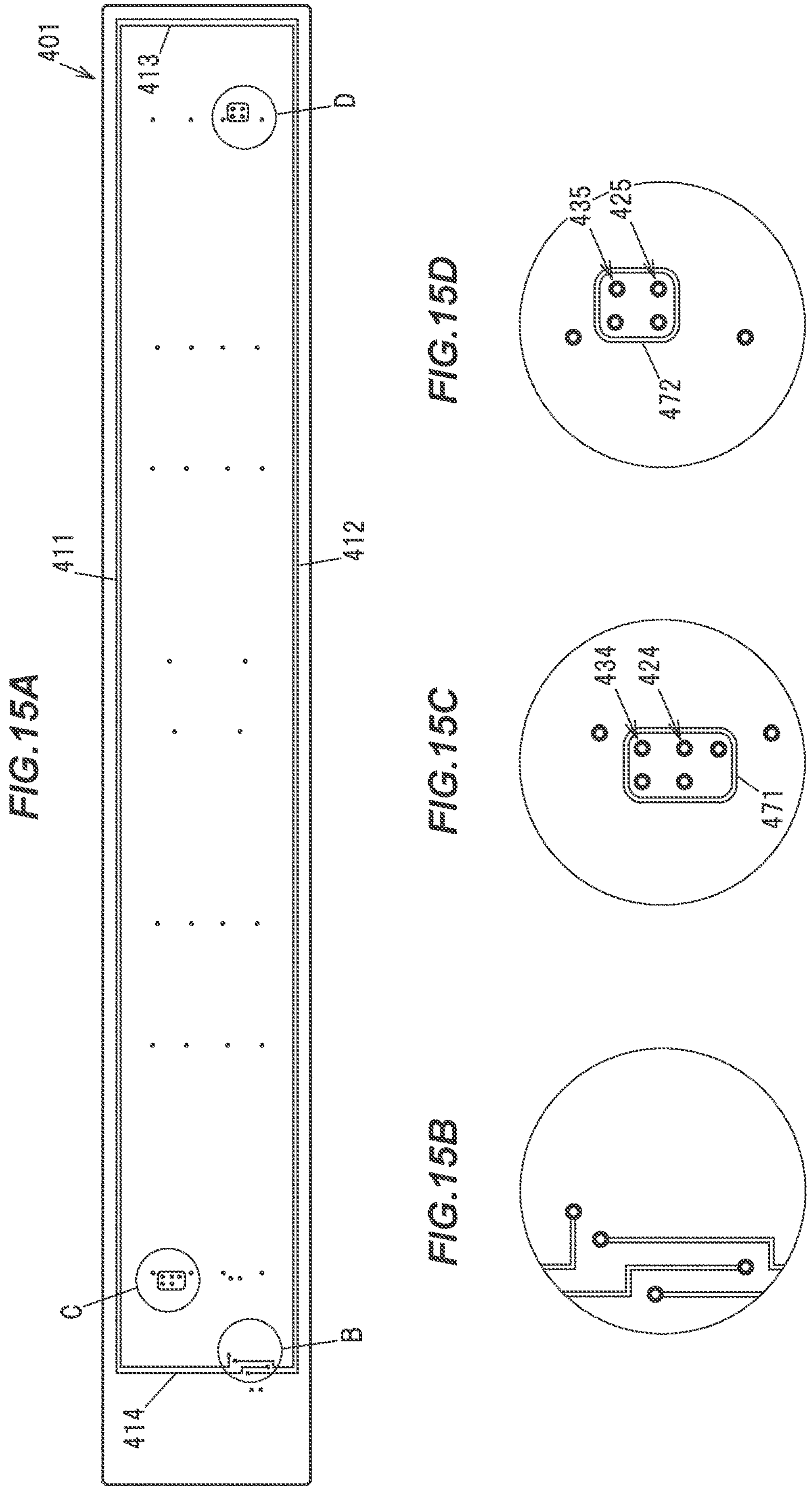
FIGS. 15A to 15D are explanatory diagrams showing the configuration of the substrate in the second embodiment.
Figures 16A, 16B, 16C, 16D:
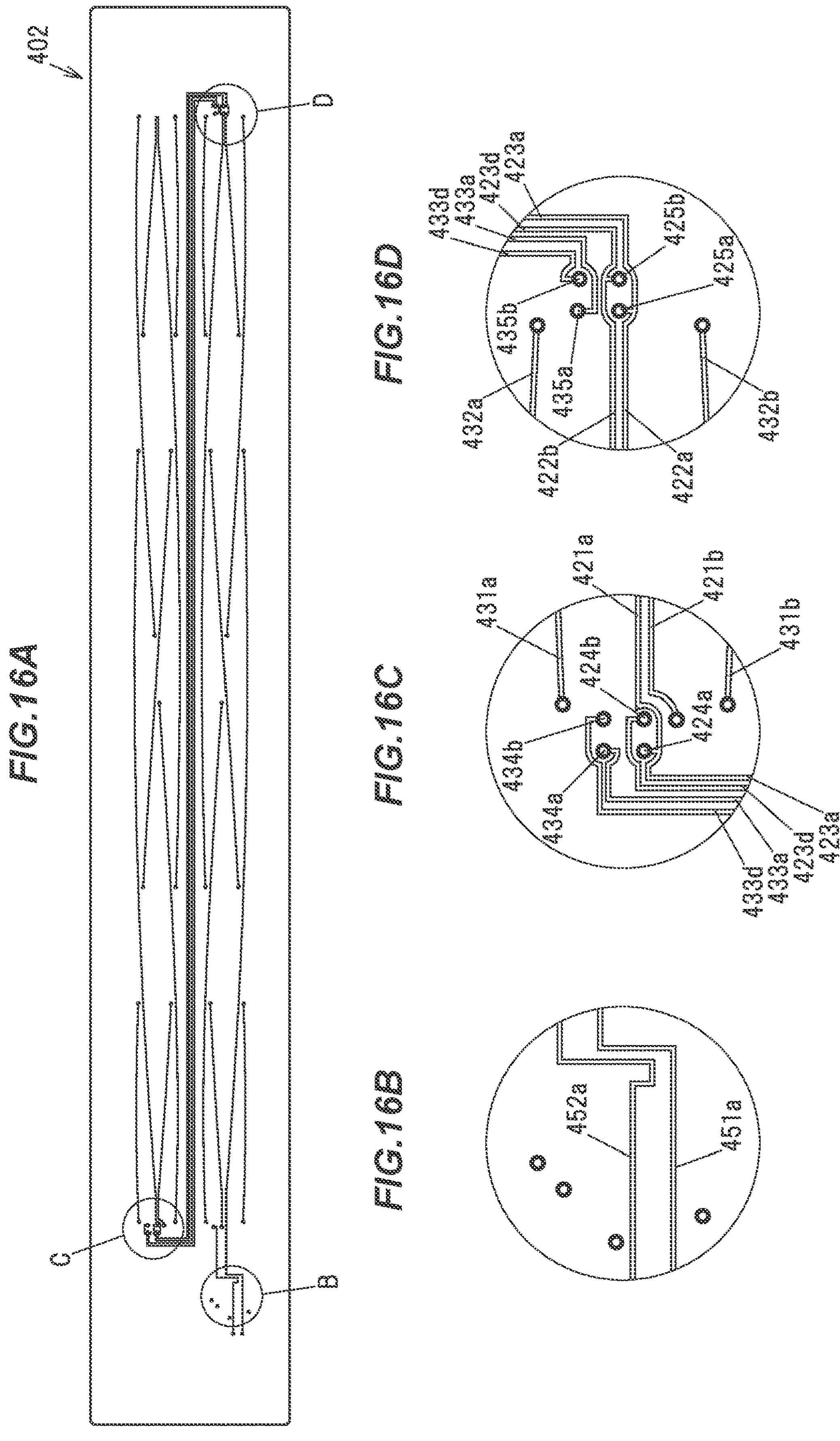
FIGS. 16A to 16D are explanatory diagrams showing the configuration of the substrate in the second embodiment.
Figures 17A, 17B, 17C, 17D:
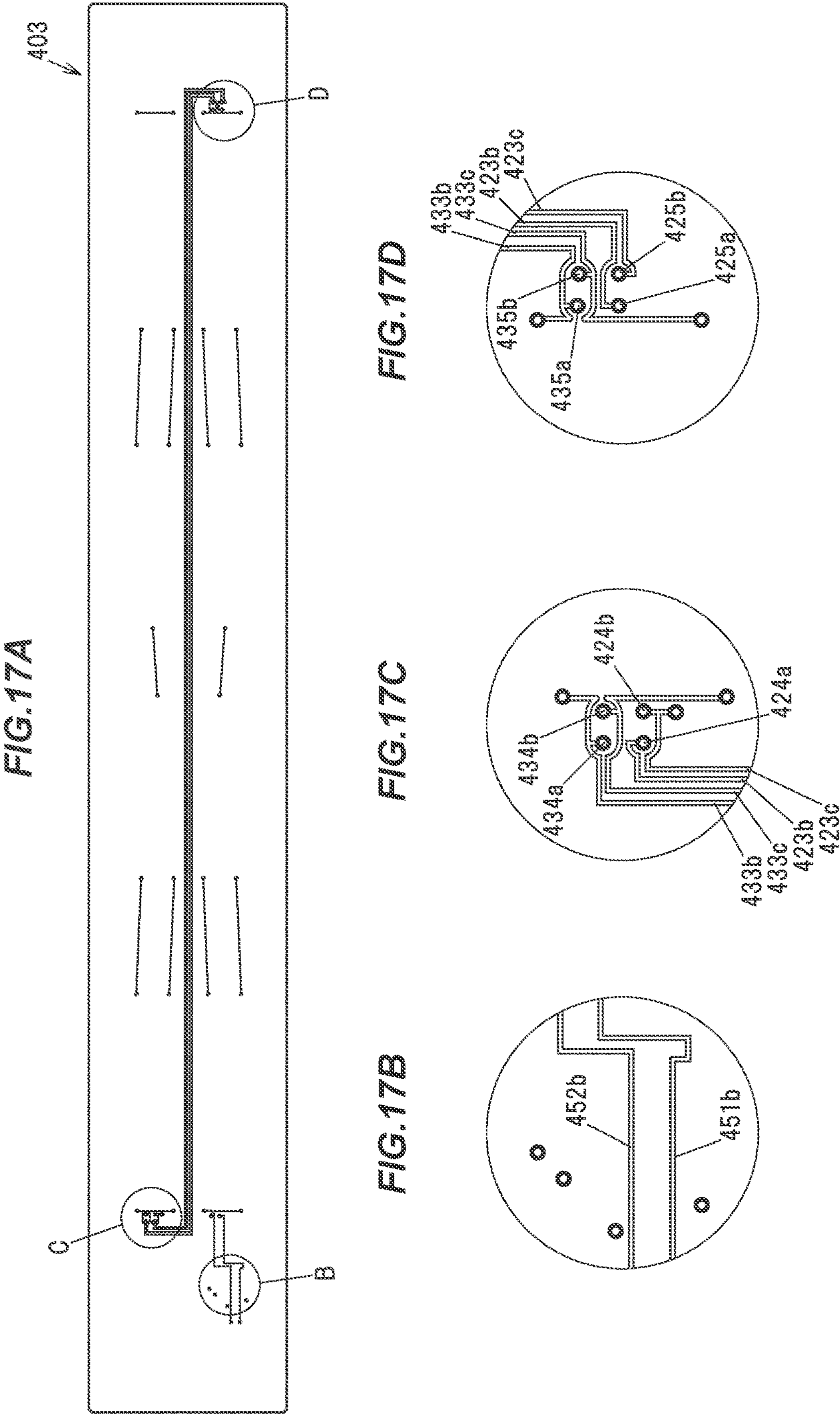
FIGS. 17A to 17D are explanatory diagrams showing the configuration of the substrate in the second embodiment.
Figures 18A, 18B, 18C, 18D:
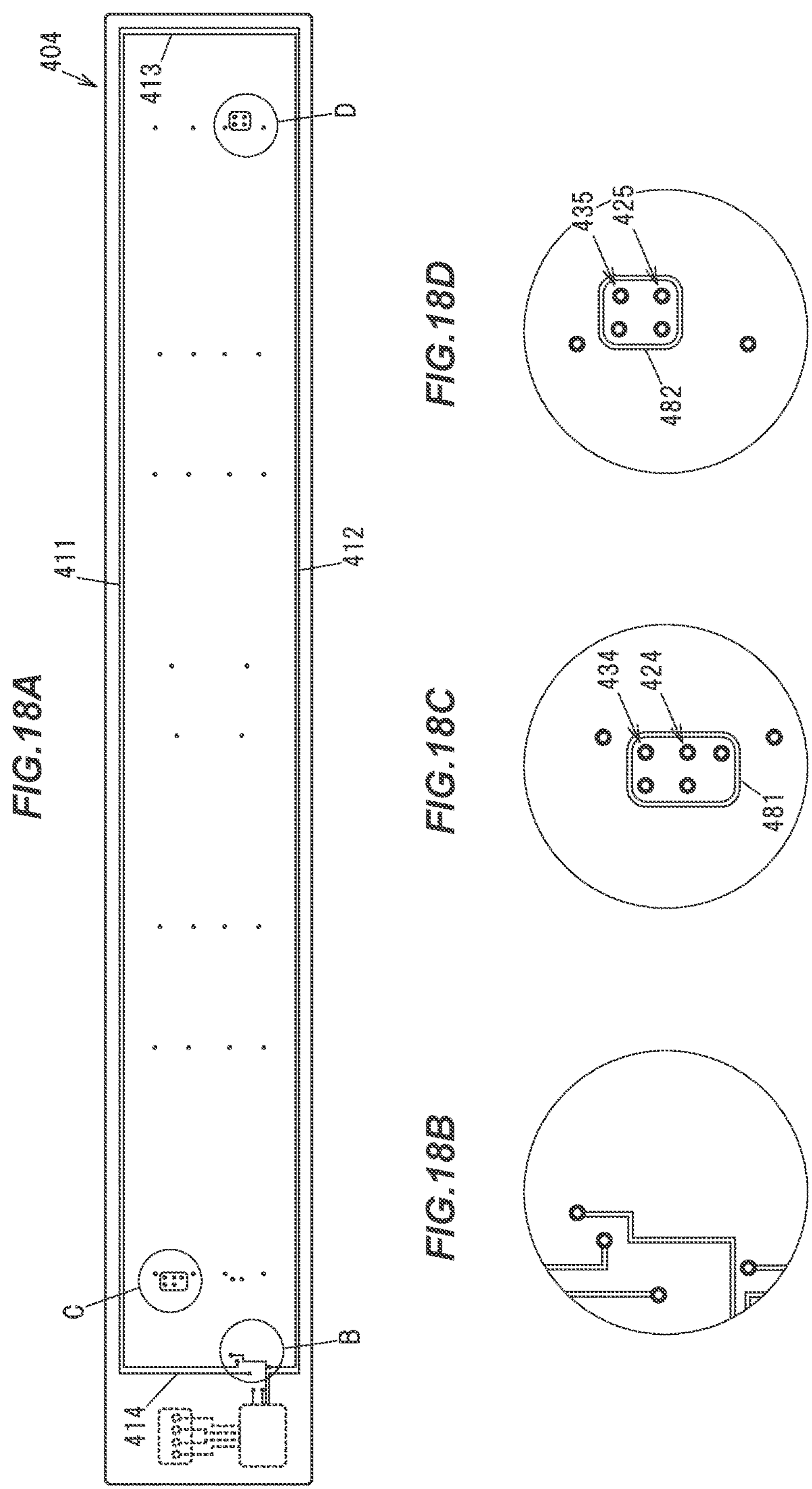
FIGS. 18A to 18D are explanatory diagrams showing the configuration of the substrate in the second embodiment.

FIG. 14A is a plan view of the wiring patterns of the first to fourth wiring layers 401 to 404 in the substrate 4 superimposed on each other as seen from the rack shaft 13 side. FIG. 15A is a plan view showing the wiring pattern of the first wiring layer 401. FIG. 16A is a plan view showing the wiring pattern of the second wiring layer 402. FIG. 17A is a plan view showing the wiring pattern of the third wiring layer 403. FIG. 18A is a plan view showing the wiring pattern of the fourth wiring layer 404. FIGS. 14B, 15B, 16B, 17B, and 18B are enlarged views of part B of each of FIGS. 14A, 15A, 16A, 17A, and 18A. FIGS. 14C, 15C, 16C, 17C, and 18C are enlarged views of part C of each of FIGS. 14A, 15A, 16A, 17A, and 18A. FIGS. 14D, 15D, 16D, 17D, and 18D are enlarged views of part D of each of FIGS. 14A, 15A, 16A, 17A, and 18A. FIG. 14E is a cross-sectional view of FIG. 14A at the E-E line. In FIGS. 14A to 14D, the wiring patterns of the second wiring layer 402 and the fourth wiring layer 404 are shown in gray.

The substrate 4 is fixed in the housing 14 parallel to the rack shaft 13 and facing the first and second target portions 21 and 22 of the target 2 fixed to the rack shaft 13, as is the substrate 3 of the first embodiment. The first wiring layer 401 is formed on a front surface 4*a* side of the substrate 4 facing the rack shaft 13. The fourth wiring layer 404 is formed on a back surface 4*b* side, which is the opposite side of the front surface 4*a*. The second wiring layer 402 is formed on the side of the first wiring layer 401 in the inner layers, and the third wiring layer 403 is formed on the side of the fourth wiring layer 404 in the inner layers.

As shown in FIG. 14E, flat plate-shaped substrates 405 to 407 are interposed between the first wiring layer 401 and the second wiring layer 402, between the second wiring layer 402 and the third wiring layer 403, and between the third wiring layer 403 and the fourth wiring layer 404, respectively. The substrate 406 between the second wiring layer 402 and the third wiring layer 403 is formed thinner in thickness than the substrate 405 between the first wiring layer 401 and the second wiring layer 402, and the substrate 407 between the third wiring layer 403 and the fourth wiring layer 404.

The substrate 4 has an excitation coil 41 that generates an alternating magnetic field, and a sine wave-shaped detection coil 42 and a cosine wave-shaped detection coil 43 with which the magnetic flux of the alternating magnetic field generated by the excitation coil 41 is interlinked. In the present embodiment, an integrated circuit (IC) 5 and a connector 6 are mounted on the back surface 4*b* side of the substrate 4, and the IC 5 is electrically connected to the steering controller 19 by a cable connected to the connector 6. The substrate 4 is provided with connector connecting wires 44 connecting the IC 5 to connector pins 61 to 64 of the connector 6, output voltage transmission lines 45 transmitting the output voltage of the sine wave-shaped detection coil 42 and the cosine wave-shaped detection coil 43 to the IC 5, and an excitation coil connecting wire 46 connecting the excitation coil 41 and the IC 5.

The excitation coil 41 is rectangular in shape having a pair of long side portions 411, 412 as a pair of extending portions extending in the axial direction of the rack shaft 13, and a pair of short side portions 413, 414 between the pair of long side portions 411, 412. The excitation coil 41 is supplied with AC voltage from the IC 5 via the excitation coil connecting wire 46.

The sine wave-shaped detection coil 42 has a first portion 421 and a second portion 422, in which an induced voltage is generated when the magnetic flux of the alternating magnetic field of the excitation coil 41 is interlinked together, and a connecting path 423 connecting one axial end of the first portion 421 and the other axial end of the second portion 422. The first portion 421 and the second portion 422 are similar in shape to the first portion 321 and the second portion 322 of the sine wave-shaped detection coil 32 in the first embodiment.

The sine wave-shaped detection coil 42 is provided between the first portion 421 and the second portion 422 of the pair of long side portions 411, 412 in the excitation coil 41, and the first portion 421 and the second portion 422 are aligned along the shortitudinal direction of the substrate 4. The connecting path 423 extends between the first portion 421 and the second portion 422 in the shortitudinal direction of the substrate 4 and along the longitudinal direction of the substrate 4. The induced voltage generated in the sine wave-shaped detection coil 42 by the magnetic flux of the alternating magnetic field generated by the excitation coil 41 interlinked together is input to the IC 5 as an output voltage of the sine wave-shaped detection coil 42.

The cosine wave-shaped detection coil 43 has a first portion 431 and a second portion 432, in which an induced voltage is generated when the magnetic flux of the alternating magnetic field of the excitation coil 41 is interlinked together, and a connecting path 433 connecting one axial end of the first portion 431 with the other axial end of the second portion 432. The first portion 431 and the second portion 432 are similar in shape to the first portion 431 and the second portion 432 of the cosine wave-shaped detection coil 43 in the first embodiment.

The cosine wave-shaped detection coil 43 is provided between the long side portion 411 and the long side portion 412 of the excitation coil 41, with the first portion 431 and the second portion 432 aligned along the shortitudinal direction of the substrate 4. The connecting path 433 extends along the longitudinal direction of the substrate 4 between the first portion 431 and the second portion 432 in the shortitudinal direction of the substrate 4. The induced voltage generated in the cosine wave-shaped detection coil 43 by the magnetic flux of the alternating magnetic field generated by the excitation coil 41 being interlinked together is input to the IC 5 as an output voltage of the cosine wave-shaped detection coil 43.

In FIG. 14A, the shape and size of the first and second target portions 21 and 22 facing the substrate 4 are shown with dashed lines as in FIG. 4A. The axial length $L_{21}$ of the first target portion 21 and the axial length $L_{22}$ of the second target portion 22 are the same. The total length of the overlap length $L_1$, which is the axial length of the range where the first portions 421, 431 of the sine wave-shaped detection coil 42 and the cosine wave-shaped detection coil 43 overlap the first target portion 21 in the direction perpendicular to the substrate 4, and the overlap length $L_2$, which is the axial length of the range in which the second portions 422, 432 of the sine wave-shaped detection coil 42 and the cosine wave-shaped detection coil 43 overlap in the direction perpendicular to the substrate 4, is the same as the axial length $L_{21}$ of the first target portion 21 and the axial length $L_{22}$ of the second target portion 22.

The output voltages of the sine wave-shaped detection coil 42 and the cosine wave-shaped detection coil 43 are input to the IC 5 via the output voltage transmission line 45. The IC 5 numerically converts the output voltages of the sine wave-shaped detection coil 42 and the cosine wave-shaped detection coil 43 by AD conversion to obtain the position of the target 2 by calculation and transmitted to the steering controller 19. The output voltage transmission line 45 is formed partly inside the excitation coil 41 and extends across the short side portion 414 on the IC 5 side in the excitation coil 41. As shown in FIG. 14B, the output voltage transmission line 45 comprises a first output voltage transmission line 451 that transmits the output voltage of the sine wave-shaped detection coil 42 and a second output voltage transmission line 452 that transmits the output voltage of the cosine wave-shaped detection coil 43.

The first output voltage transmission line 451 has a conductor wire 451*a* provided in the second wiring layer 402 and a conductor wire 451*b* provided in the third wiring layer 403, and the conductor wires 451*a* and 451*b* are installed so that they overlap in the thickness direction of the substrate 4. The first output voltage transmission line 451 has a first cancel circuit portion 451*c* inside the excitation coil 41, in which the conductor wires 451*a*, 451*b* form a loop shape when the substrate 4 is viewed in the thickness direction. An induced voltage is generated in the first cancel circuit portion 451*c* when the magnetic flux of the alternating magnetic field generated by the excitation coil 41 is interlinked together. The induced voltage generated in the first cancel circuit portion 451*c* is large enough to cancel the offset voltage that would be generated in the first portion 421 and the second portion 422 of the sine wave-shaped detection coil 42 if an AC voltage were supplied to the excitation coil 41 with the substrate 4 alone without the rack shaft 13 and the target 2.

Similarly, the second output voltage transmission line 452 has a conductor wire 452*a* provided in the second wiring layer 402 and a conductor wire 452*b* provided in the third wiring layer 403, and the conductor wires 452*a* and 452*b* are installed so that they overlap in the thickness direction of the substrate 4. The second output voltage transmission line 452 has a second cancel circuit portion 452*c* inside the excitation coil 41, in which the conductor wires 452*a*, 452*b* form a loop shape when the substrate 4 is viewed in the thickness direction. In the second cancel circuit portion 452*c*, an induced voltage is generated when the magnetic flux of the alternating magnetic field generated by the excitation coil 41 is interlinked together. The induced voltage generated in the second cancel circuit portion 452*c* is large enough to cancel the offset voltage that would be generated in the first portion 431 and the second portion 432 of the cosine wave-shaped detection coil 43 if an AC voltage were supplied to the excitation coil 41 with the substrate 4 alone without the rack shaft 13 and the target 2.

The connecting path 423 of the sine wave-shaped detection coil 42 has first to fourth connecting wires 423*a* to 423*d*, connecting a pair of conductor wires 421a, 421b in the first portion 421 of the sine wave-shaped detection coil 42 and a pair of conductor wires 422a, 422b in the second portion 422 of the sine wave-shaped detection coil 42. The first connecting wire 423a and the second connecting wire 423b are connected to the first connecting wire 423a. The first connecting wire 423a and the second connecting wire 423b are electrically short-circuited at both ends of the connecting path 423, and one conductor wire 421a of the pair of conductor wires 421a, 421b in the first portion 421 and one conductor wire 422a of the pair of conductor wires 422a, 422b in the second portion 422 are connected in parallel. The third connecting wire 423c and the fourth connecting wire 423d are electrically short-circuited at both ends of the connecting path 423, and the other conductor wire 421b of the pair of conductor wires 421a, 421b in the first portion 421 and the other conductor wire 422b of the pair of conductor wires 422a, 422b in the second portion 422 are connected in parallel.

The first and second connecting wires 423a, 423b and the third and fourth connecting wires 423c, 423d have opposite polarity, and a potential difference is generated between the first and second connecting wires 423a, 423b and the third and fourth connecting wires 423c, 423d according to the output voltage of the sine wave-shaped detection coil 42. When a current flows between the first portion 421 and the second portion 422 of the sine wave-shaped detection coil 42 due to the alternating magnetic field generated by the excitation coil 41, the directions of the currents flowing in the first and second connecting wires 423a, 423b and in the third and fourth connecting wires 423c, 423d are opposite each other in the longitudinal direction of the substrate 4.

The first connecting wire 423a and the fourth connecting wire 423d are formed in the second wiring layer 402 of the substrate 4, and the second connecting wire 423b and the third connecting wire 423c are formed in the third wiring layer 403 of the substrate 4. The first connecting wire 423a and the third connecting wire 423c are aligned in the thickness direction of the substrate 4 across the substrate 406. The second connecting wire 423b and the fourth connecting wire 423d are aligned in the thickness direction of the substrate 4 across the substrate 406. This configuration of the connecting path 423 suppresses the voltage induced in the connecting path 423 by the magnetic flux interlinked to the portion between the first portion 421 and the second portion 422 of the sine wave-shaped detection coil 42 in the substrate 4.

The connecting path 423 of the sine wave-shaped detection coil 42 has a first connection portion 424 at the end of the first portion 421 and a second connection portion 425 at the end of the second portion 422. The first connection portion 424 has a via 424a connecting one conductor wire 421a in the first portion 421 to the first connecting wire 423a and the second connecting wire 423b, and a via 424b connecting the other conductor wire 421b in the first portion 421 to the third connecting wire 423c and the fourth connecting wire 423d. The second connection portion 425 has a via 425a connecting one conductor wire 422a to the first connecting wire 423a and the second connecting wire 423b in the second portion 422, and a via 425b connecting the other conductor wire 422b to the third connecting wire 423c and the fourth connecting wire 423d in the second portion 422.

The connecting path 433 of the cosine wave-shaped detection coil 43 is parallel to the connecting path 423 of the sine wave-shaped detection coil 42 and is configured in the same manner as the connecting path 423 of the sine wave-shaped detection coil 42. In other words, the connecting path 433 of the cosine wave-shaped detection coil 43 has the first to fourth connecting wires 433a to 433d, and connects a pair of conductor wires 431a, 431b in the first portion 431 of the cosine wave-shaped detection coil 43 and a pair of conductor wires 432a, 432b in the second portion 432 of the cosine wave-shaped detection coil 43 are connected to the first pair of connecting wires 433a and 433b. The first connecting wire 433a and the second connecting wire 433b are electrically short-circuited at both ends of the connecting path 433, and one conductor wire 431a of the pair of conductor wires 431a, 431b in the first portion 431 and one conductor wire 432a of the pair of conductor wires 432a, 432b in the second portion 432 are connected in parallel.

The third connecting wire 433c and the fourth connecting wire 433d are electrically short-circuited at both ends of the connecting wire path, and the other conductor wire 431b of the pair of conductor wires 431a, 431b in the first portion 431 and the other conductor wire 432b of the pair of conductor wires 432a, 432b in the second portion 432 are connected in parallel.

The first and second connecting wires 433a, 433b and the third and fourth connecting wires 433c, 433d have opposite polarity. The first and fourth connecting wires 433a and 433d are formed in the second wiring layer 402 of the substrate 4, and the second and third connecting wires 433b and 433c are formed in the third wiring layer 403 of the substrate 4. The first connecting wire 433a and the third connecting wire 433c are aligned in the thickness direction of the substrate 4 across the substrate 406. The second connecting wire 433b and the fourth connecting wire 433d are aligned in the thickness direction of the substrate 4 across the substrate 406. This configuration of the connecting path 433 suppresses the voltage induced in the connecting path 433 by the magnetic flux interlinked to the portion between the first portion 431 and the second portion 432 of the cosine wave-shaped detection coil 43 in the substrate 4.

The connecting path 433 of the cosine wave-shaped detection coil 43 has a first connection portion 434 at the end of the first portion 431 and a second connection portion 435 at the end of the second portion 432. The first connection portion 434 has a via 434a connecting one conductor wire 431a in the first portion 431 to the first connecting wire 433a and the second connecting wire 433b, and a via 434b connecting the other conductor wire 431b in the first portion 431 to the third connecting wire 433c and the fourth connecting wire 433d. The second connection portion 435 has a via 435a connecting one conductor wire 432a to the first connecting wire 433a and the second connecting wire 433b in the second portion 432, and a via 435b connecting the other conductor wire 432b to the third connecting wire 433c and the fourth connecting wire 433d in the second portion 432.

As shown in FIGS. 15A to 15D and 18A to 18D, the first wiring layer 401 and the fourth wiring layer 404 include first annular conductors 471, 481 formed in an annular shape to surround the first connection portion 424 of the connecting path 423 of the sine wave-shaped detection coil 42 and the first connection portion 434 of the connecting path 433 of the cosine wave-shaped detection coil 43, and second annular conductors 472, 482 formed in an annular shape to surround the second connection portion 425 of the connecting path 423 of the detection coil 42 and the second connection portion 435 of the connecting path 433 of the cosine wave-shaped detection coil 43.

A current flows in the first annular conductors 471, 481 and the second annular conductors 472, 482 when the magnetic flux of the alternating magnetic field generated by the excitation coil 41 is interlinked together, and the magnetic field generated by this current weakens the magnetic field at the first and second connection portions 424, 425 of the sine wave-shaped detection coil 42 and the first and second connection portions 434, 435 of the cosine wave-shaped detection coil 43. In FIGS. 14A to 14D, the first annular conductors 471, 481 and the second annular conductors 472, 482 are omitted in order to clearly show the circuit configuration of the sine wave-shaped detection coil 42 and cosine wave-shaped detection coil 43.

In the present embodiment, the first target portion 21 and the second target portion 22 of the target 2 are composed of conductors in which eddy currents are generated by the alternating magnetic field generated by the excitation coil 41. In the present embodiment, the first target portion 21 faces only a part in the shortitudinal direction of the substrate 4 of the first portions 421, 431 of the sine wave-shaped detection coil 42 and the cosine wave-shaped detection coil 43, and the second target portion 22 faces only a part in the shortitudinal direction of the substrate 4 of the second portions 422, 432 of the sine wave-shaped detection coil 42 and the cosine wave-shaped detection coil 43.

Specifically, the first target portion 21 faces the end of the long side portion 411 side of the excitation coil 41 in the first portions 421, 431 of the sine wave-shaped detection coil 42 and the cosine wave-shaped detection coil 43, and does not face the second portions 422, 432 side (connecting paths 423, 433 side) in the first portions 421, 431, in the shortitudinal direction of the substrate 4. In addition, the second target portion 22 faces the end of the long side portion 412 side of the excitation coil 41 in the second portions 422, 432 of the sine wave-shaped detection coil 42 and the cosine wave-shaped detection coil 43, and does not face the end of the first portions 421, 431 side (connecting wires 423, 432 side) in the second portions 422, 432, in the shortitudinal direction of the substrate 4.

With this configuration of the target 2, the magnetic field is weakened by the eddy currents flowing in the first target portion 21 and the second target portion 22 in the area near the long side portions 411, 412 of the excitation coil 41, where the intensity of the magnetic field is relatively strong, and the magnetic field is not weakened by the first target portion 21 and the second target portion 22 near the center of the substrate 4 in the shortitudinal direction, where the intensity of the magnetic field is relatively weak. As a result, the magnetic field intensity in the portion of the substrate 4 facing the first target portion 21 or the second target portion 22 and the portion aligned with that portion in the shortitudinal direction of the substrate 4 is made uniform, and the detection accuracy of the position of the rack shaft 13 is improved.

According to the second embodiment described above, in addition to the effects described in the first embodiment, the voltage induced in the connecting path 423 of the sine wave-shaped detection coil 42 and the connecting path 433 of the cosine wave-shaped detection coil 43 by the alternating magnetic field generated by the excitation coil 41 is suppressed, and the accuracy of the detection of the position of the rack shaft 13 is improved. The detection accuracy of the position of the rack shaft 13 is also improved by the configuration in which the first target portion 21 and the second target portion 22 of the target 2 face only a part of the first portions 421, 431 and the second portions 422, 432 of the sine wave-shaped detection coil 42 and the cosine wave-shaped detection coil 43.

Figure 19:
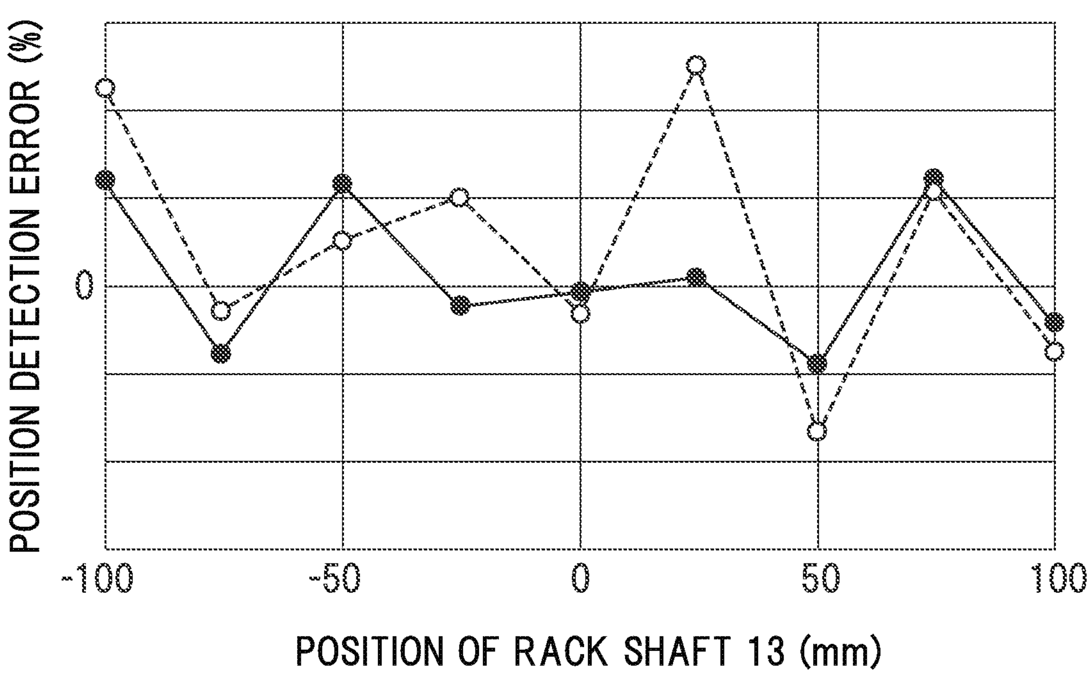
FIG. 19 is a graph showing a position detection error in the second embodiment.

FIG. 19 is a graph showing the amount of movement of the rack shaft 13 in the left and right directions from the neutral position on the horizontal axis and the detection error of the position of the rack shaft 13 on the vertical axis. In this graph, the white circle shows the detection error when the substrate 3 in the first embodiment is used, and the black circle shows the detection error when the substrate 4 in the second embodiment is used. As shown in FIG. 19, when the substrate 4 in the second embodiment is used, the detection error is smaller on average than when the substrate 3 in the first embodiment is used. In addition, when the substrate 4 in the second embodiment is used, the maximum detection error is smaller than when the substrate 3 in the first embodiment is used.

Modified Example of the Second Embodiment

Figure 20:
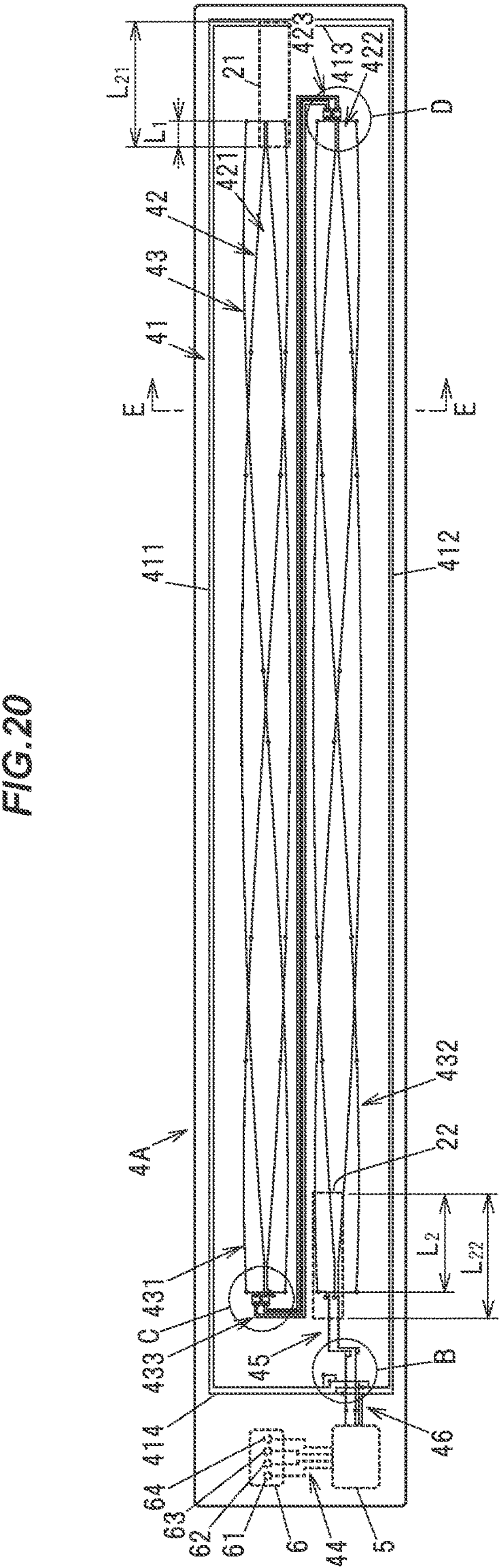
FIG. 20 is an explanatory diagram showing a modified example of the second embodiment.

FIG. 20 shows a modified example of the second embodiment. In the second embodiment, the case where the first target portion 21 and the second target portion 22 of the target 2 are made of conductive material is described, but in the modified example shown in FIG. 20, the first target portion 21 and the second target portion 22 are made of ferrite or other high magnetic permeability material. The configuration of the substrate 4 is the same as in the second embodiment described with reference to FIGS. 14A to 14D, etc., with the sine wave-shaped detection coil 42 and the cosine wave-shaped detection coil 43 provided between the pair of long side portions 411, 412 of the excitation coil 41.

As shown in FIG. 20, the first target portion 21 faces the end of the second portions 422, 432 side (connecting wires 423, 433 side) in the first portions 421, 431 of the sine wave-shaped detection coil 42 and the cosine wave-shaped detection coil 43 in the shortitudinal direction of the substrate 4, and does not face the end of the long side portion 411 side in the first portions 421, 431 of the sine wave-shaped detection coil 42 and the cosine wave-shaped detection coil 43 in the shortitudinal direction of the substrate 4. The second target portion 22 faces the end of the first portions 421, 431 side (connecting paths 423, 433 side) in the second portions 422, 432 of the sine wave-shaped detection coil 42 and the cosine wave-shaped detection coil 43 in the shortitudinal direction of the substrate 4, and does not face the end of the long side portion 412 side of the second portions 422, 432 of the wave-shaped detection coil 43.

This configuration makes the magnetic field intensity uniform in the portion of the substrate 4 that faces the first target portion 21 or the second target portion 22 and in the portion that is aligned with that portion in the shortitudinal direction of the substrate 4, thereby improving the detection accuracy of the position of the rack shaft 13.

Third Embodiment

Referring now to FIGS. 21A to 26, a substrate 4A in the third embodiment of the invention will be described. The substrate 4A is constituted in roughly the same manner as the substrate 4 in the second embodiment, but the configuration of a connecting path 426 connecting the first portion 421 and the second portion 422 of the sine wave-shaped detection coil 42 differs from that of the connecting path 423 in the second embodiment, and the configuration of the connecting path 436 connecting the first portion 431 and the second portion 432 of the cosine wave-shaped detection coil 43 differs from that of the connecting path 433 in the second embodiment. In FIGS. 21A to 25D, components common to those described in the second embodiment are marked with the same symbols as those in FIGS. 14A to 18D, and redundant explanations are omitted.

Figures 21A, 21B, 21C, 21D:
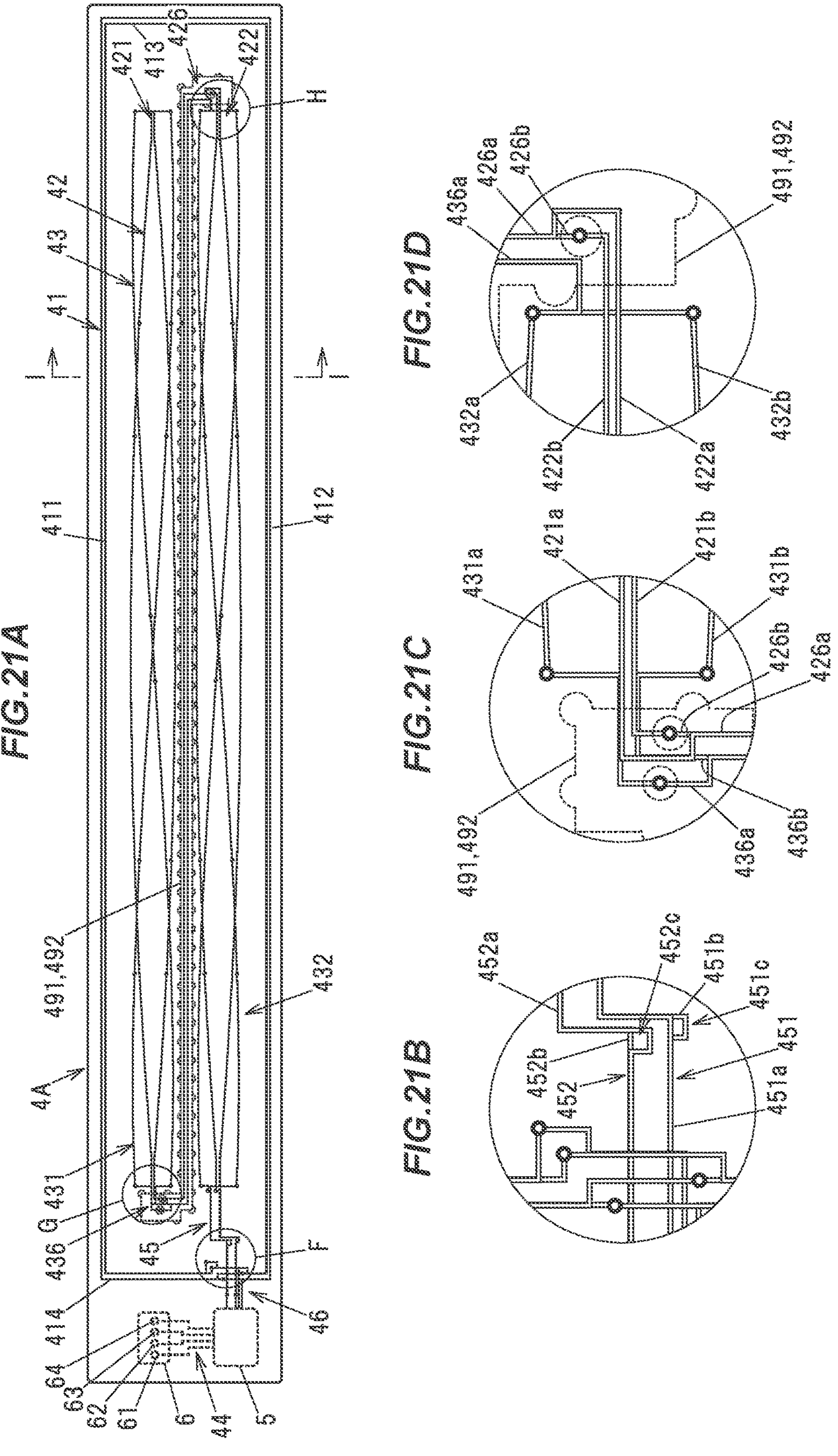
FIGS. 21A to 21D are explanatory diagrams showing the configuration of a substrate in the third embodiment.
Figures 22A, 22B, 22C, 22D:
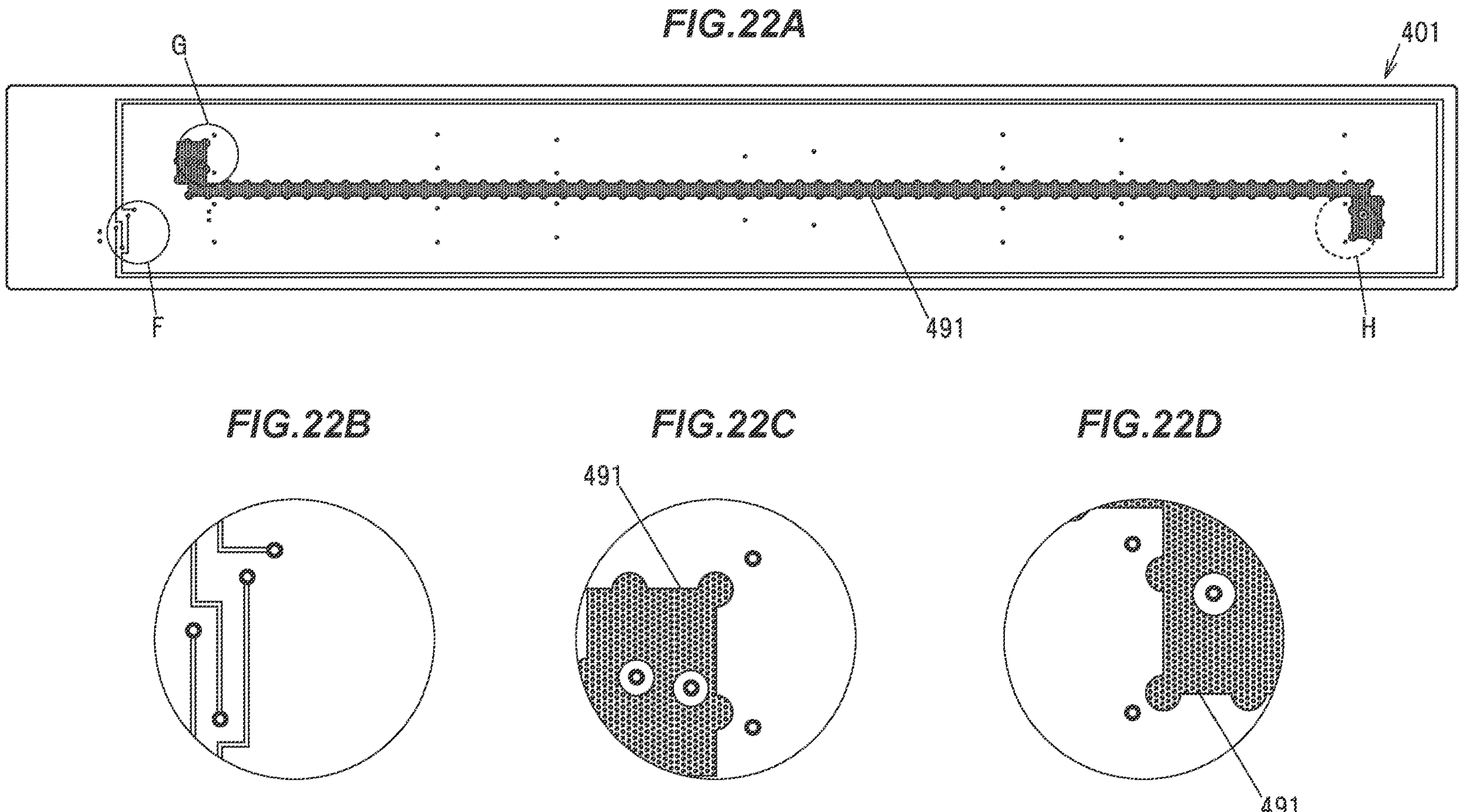
FIGS. 22A to 22D are explanatory diagrams showing the configuration of the substrate in the third embodiment.
Figures 23A, 23B, 23C, 23D:
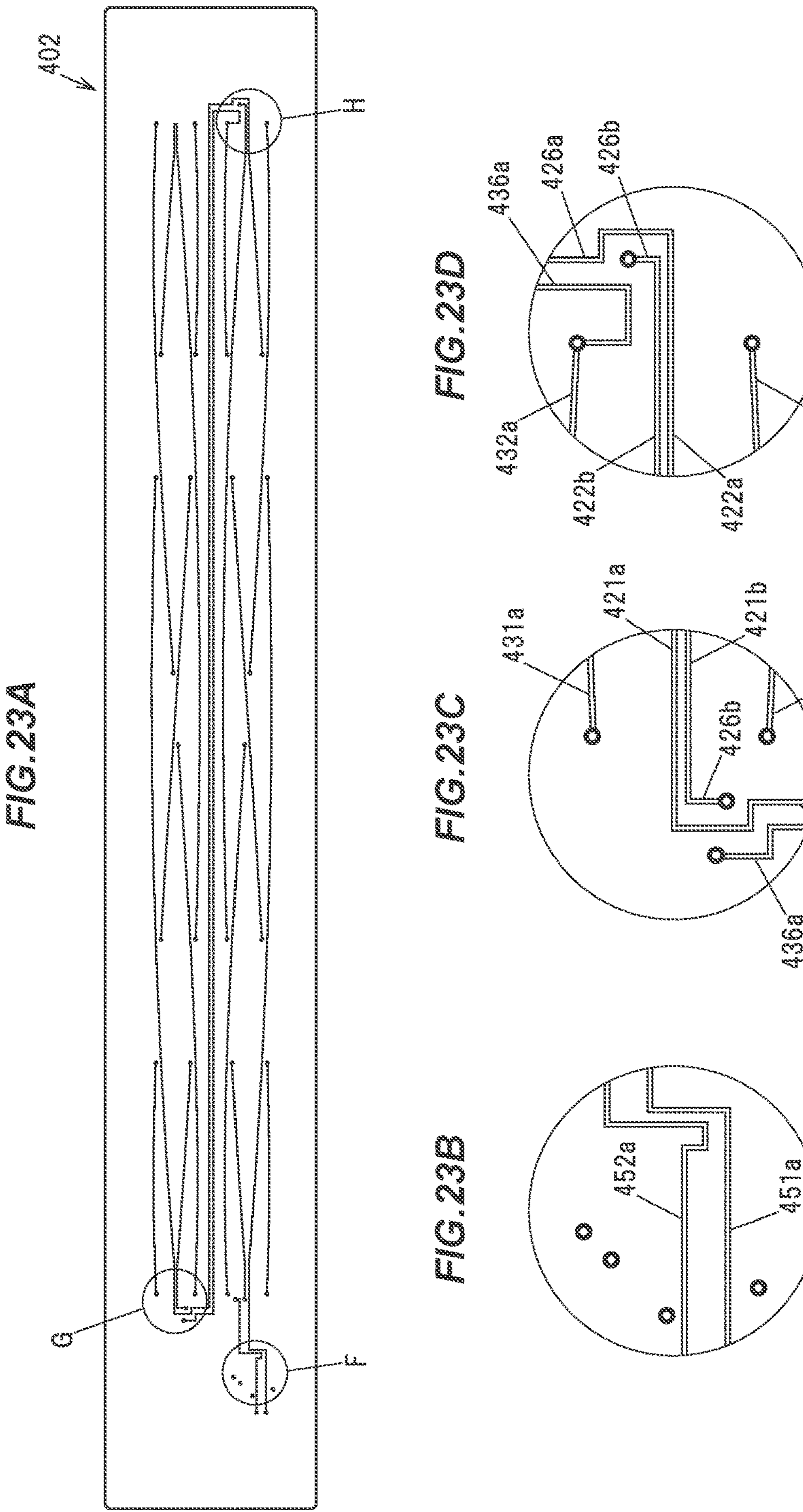
FIGS. 23A to 23D are explanatory diagrams showing the configuration of the substrate in the third embodiment.
Figures 24A, 24B, 24C, 24D:
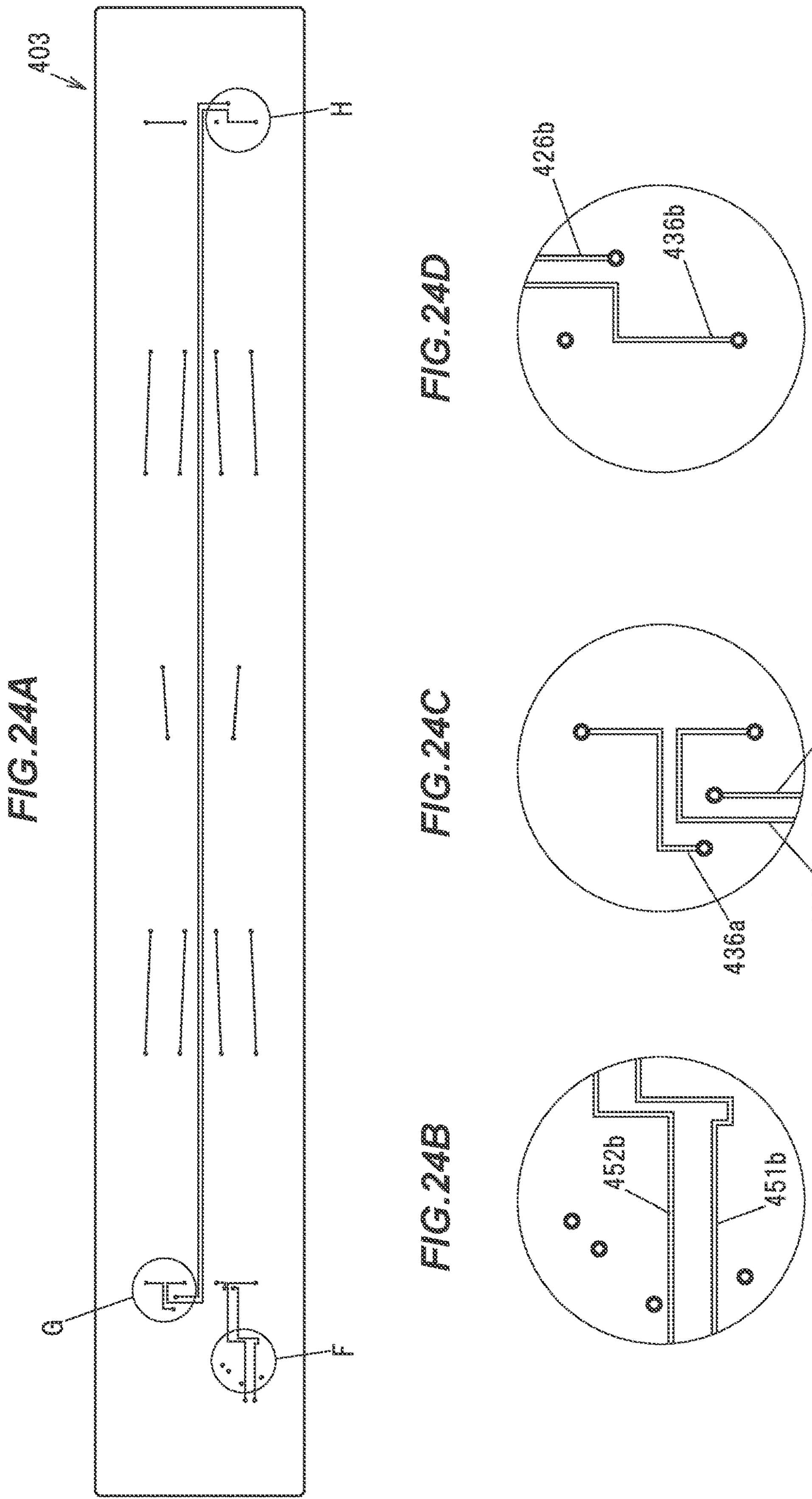
FIGS. 24A to 24D are explanatory diagrams showing the configuration of the substrate in the third embodiment.
Figures 25A, 25B, 25C, 25D:
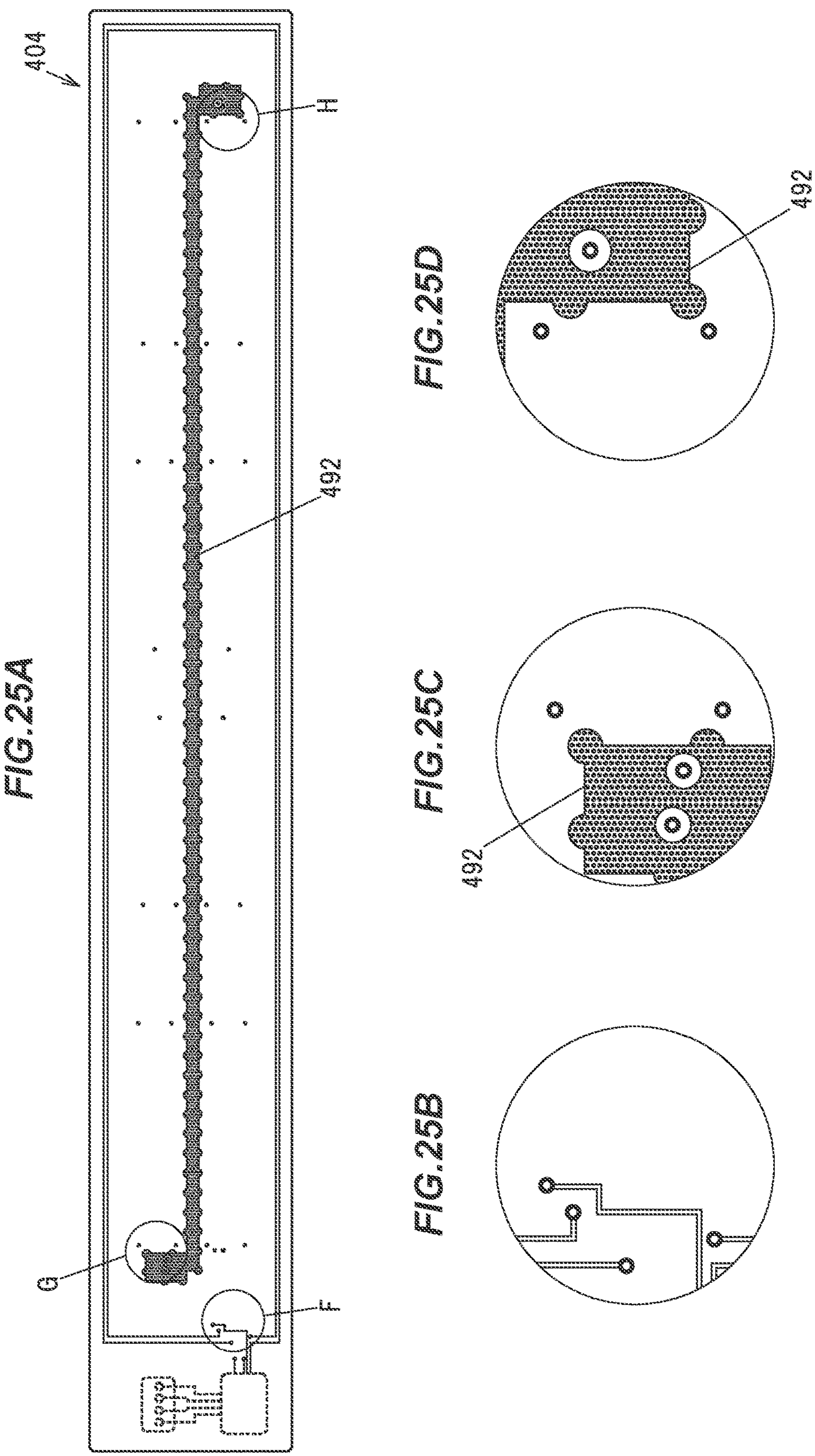
FIGS. 25A to 25D are explanatory diagrams showing the configuration of the substrate in the third embodiment.
Figure 26:
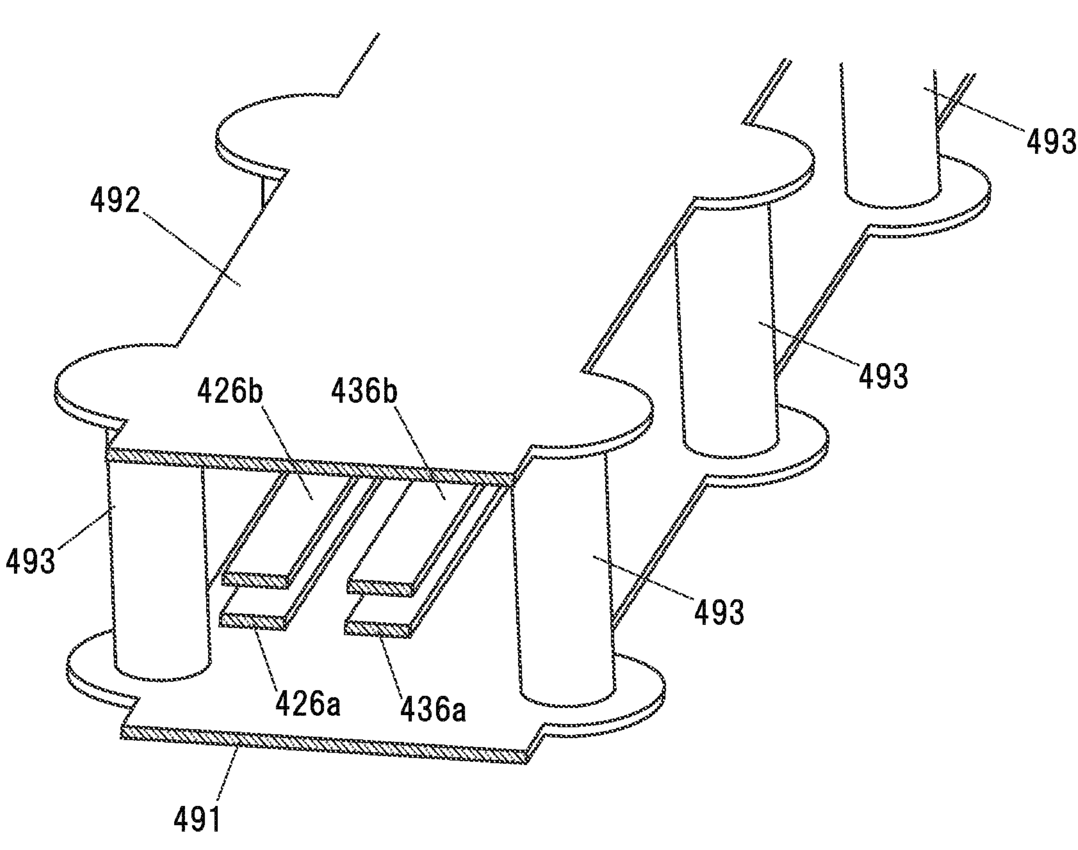
FIG. 26 is an oblique cross-sectional view of the wiring pattern in the periphery of the connecting wire in the I-I line of FIG. 21A.

FIG. 21A is a plan view of the wiring patterns of the first to fourth wiring layers 401 to 404 on the substrate 4A superimposed on each other. FIG. 22A is a plan view showing the wiring pattern of the first wiring layer 401. FIG. 23A is a plan view showing the wiring pattern of the second wiring layer 402. FIG. 24A is a plan view showing the wiring pattern of the third wiring layer 403. FIG. 25A is a plan view showing the wiring pattern of the fourth wiring layer 404. FIGS. 21B, 22B, 23B, 24B, and 25B are enlarged views of F part in FIGS. 21A, 22A, 23A, 24A, and 25A. FIGS. 21C, 22C, 23C, 24C, and 25C are enlarged views of part G in FIGS. 21A, 22A, 23A, 24A, and 25A. FIGS. 21D, 22D, 23D, 24D, and 25D are enlarged views of part H in FIGS. 21A, 22A, 23A, 24A, and 25A. FIG. 26 is an oblique cross-sectional view of the wiring patterns in the periphery of the connecting paths 426, 436 in the I-I line of FIG. 21A.

The connecting path 426 of the sine wave-shaped detection coil 42 extends along the longitudinal direction of the substrate 4A between the first portion 421 and the second portion 422 in the shortitudinal direction of the substrate 4A. The connecting path 436 of the cosine wave-shaped detection coil 43 extends along the longitudinal direction of the substrate 4A between the first portion 431 and the second portion 432 in the shortitudinal direction of the substrate 4A.

The connecting path 426 of the sine wave-shaped detection coil 42 has a first connecting wire 426*a* connecting one conductor wire 421*a* of the pair of conductor wires 421*a*, 421*b* in the first portion 421 of the sine wave-shaped detection coil 42 to one conductor wire 422*a* of the pair of conductor wires 422*a*, 422*b* in the second portion 422 and a second connecting wire 426*b* connecting the other conductor wire 421*b* in the first portion 421 and the other conductor wire 422*b* in the second portion 422 of the sine wave-shaped detection coil 42.

Between the first portion 421 and the second portion 422 of the sine wave-shaped detection coil 42, the first connecting wire 426*a* is formed in the second wiring layer 402 and the second connecting wire 426*b* is formed in the third wiring layer 403, and the first connecting wire 426*a* and the second connecting wire 426*b* are installed so that they overlap in the thickness direction of the substrate 4A. The first connecting wire 426*a* and the second connecting wire 426*b* have opposite polarity, and a potential difference is generated between the first connecting wire 426*a* and the second connecting wire 426*b* in accordance with the output voltage of the sine wave-shaped detection coil 42.

The connecting path 436 of the cosine wave-shaped detection coil 43 has a first connecting wire 436*a* connecting one conductor wire 431*a* of the pair of conductor wires 431*a*, 431*b* in the first portion 431 to one conductor wire 432*a* of the pair of conductor wires 432*a*, 432*b* in the second portion 432 of the cosine wave-shaped detection coil 43, and a second connecting wire 436*b* connecting the other conductor wire 431*b* in the first portion 431 to the other conductor wire 432*b* in the second portion 432 of the cosine wave-shaped detection coil 43.

Between the first portion 431 and the second portion 432 of the cosine wave-shaped detection coil 43, the first connecting wire 436*a* is formed in the second wiring layer 402 and the second connecting wire 436*b* is formed in the third wiring layer 403, and the first connecting wire 436*a* and the second connecting wire 436*b* are installed so that they overlap in the thickness direction of the substrate 4A. The first connecting wire 436*a* and the second connecting wire 436*b* have opposite polarity, and a potential difference is generated between the first connecting wire 436*a* and the second connecting wire 436*b* in accordance with the output voltage of the cosine wave-shaped detection coil 43.

In the present embodiment, in order to suppress the voltage induced in the connecting path 426 of the sine wave-shaped detection coil 42 and the connecting path 436 of the cosine wave-shaped detection coil 43 by the alternating magnetic field generated by the excitation coil 41, a pair of shield patterns 491 and 492 that suppress the magnetic flux interlinked to the connecting paths 426 and 436 are formed on the substrate 4A. One shield pattern 491 is formed on the first wiring layer 401 and the other shield pattern 492 is formed on the fourth wiring layer 404. The connecting paths 426, 436 are formed between the pair of shield patterns 491, 492 in the thickness direction of the substrate 4A. In FIGS. 21A to 21D, the outlines of the shield patterns 491, 492 are shown as dashed lines.

As shown in FIG. 26, the pair of shield patterns 491, 492 are connected by a plurality of vias 493. The plurality of vias 493 are formed in rows along the periphery of the pair of shield patterns 491, 492. In the portion between the first portions 421, 431 and the second portions 422, 432 of the sine wave-shaped detection coil 42 and the cosine wave-shaped detection coil 43 in the shortitudinal direction of the substrate 4A, the connecting paths 426, 436 are formed between the plurality of vias 493 formed at the ends on the first portions 421, 431 side and the plurality of vias 493 formed at the ends on the second portions 422, 432 side.

Figure 27:
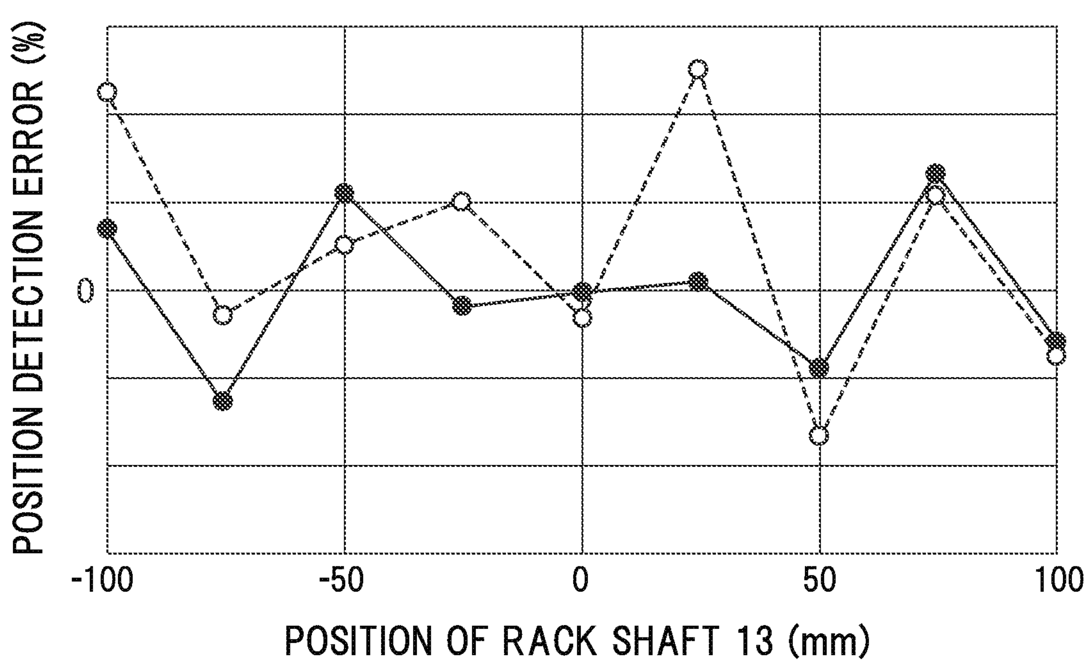
FIG. 27 is a graph showing a position detection error in the third embodiment.

FIG. 27 is a graph showing the amount of movement of the rack shaft 13 from the neutral position to the left or right on the horizontal axis and the detection error of the position of the rack shaft 13 on the vertical axis. In this graph, the white circle shows the detection error when the substrate 3 in the first embodiment is used, and the black circle shows the detection error when the substrate 4A in the third embodiment is used. As shown in FIG. 27, when the substrate 4A in the third embodiment is used, the detection error is smaller on average than when the substrate 3 in the first embodiment is used. In addition, the maximum value of detection error is smaller when the substrate 4A in the third embodiment is used than when the substrate 3 in the first embodiment is used.

According to the third embodiment described above, as in the second embodiment, the voltage induced in the connecting path 426 of the sine wave-shaped detection coil 42 and the connecting path 436 of the cosine wave-shaped detection coil 43 by the alternating magnetic field generated by the excitation coil 41 is suppressed, and the detection accuracy of the position of the rack shaft 13 is improved. The shield patterns 491, 492 in the third embodiment may be provided on the substrate 4 in the second embodiment to suppress the magnetic flux interlinked to the connecting paths 423, 433 of the substrate 4.

Fourth Embodiment

Referring now to FIGS. 28A to 28C and FIGS. 29A to 29B, a substrate 4B in the fourth embodiment of the invention is described. The substrate 4B is constituted in roughly the same manner as the substrate 4 in the second embodiment, but the configuration of a connecting path 428 connecting the first portion 421 and the second portion 422 of the sine wave-shaped detection coil 42 and the configuration of a connecting path 438 connecting the first portion 431 and the second portion 432 of the cosine wave-shaped detection coil 43 are different from the configurations of the connecting paths 423 and 433 in the second embodiment. In FIGS. 28A to 28C and FIGS. 29A to 29B, components common to those described in the second embodiment are marked with the same symbols as those in FIGS. 14A to 18D, and redundant explanations are omitted.

Figures 28A, 28B, 28C:
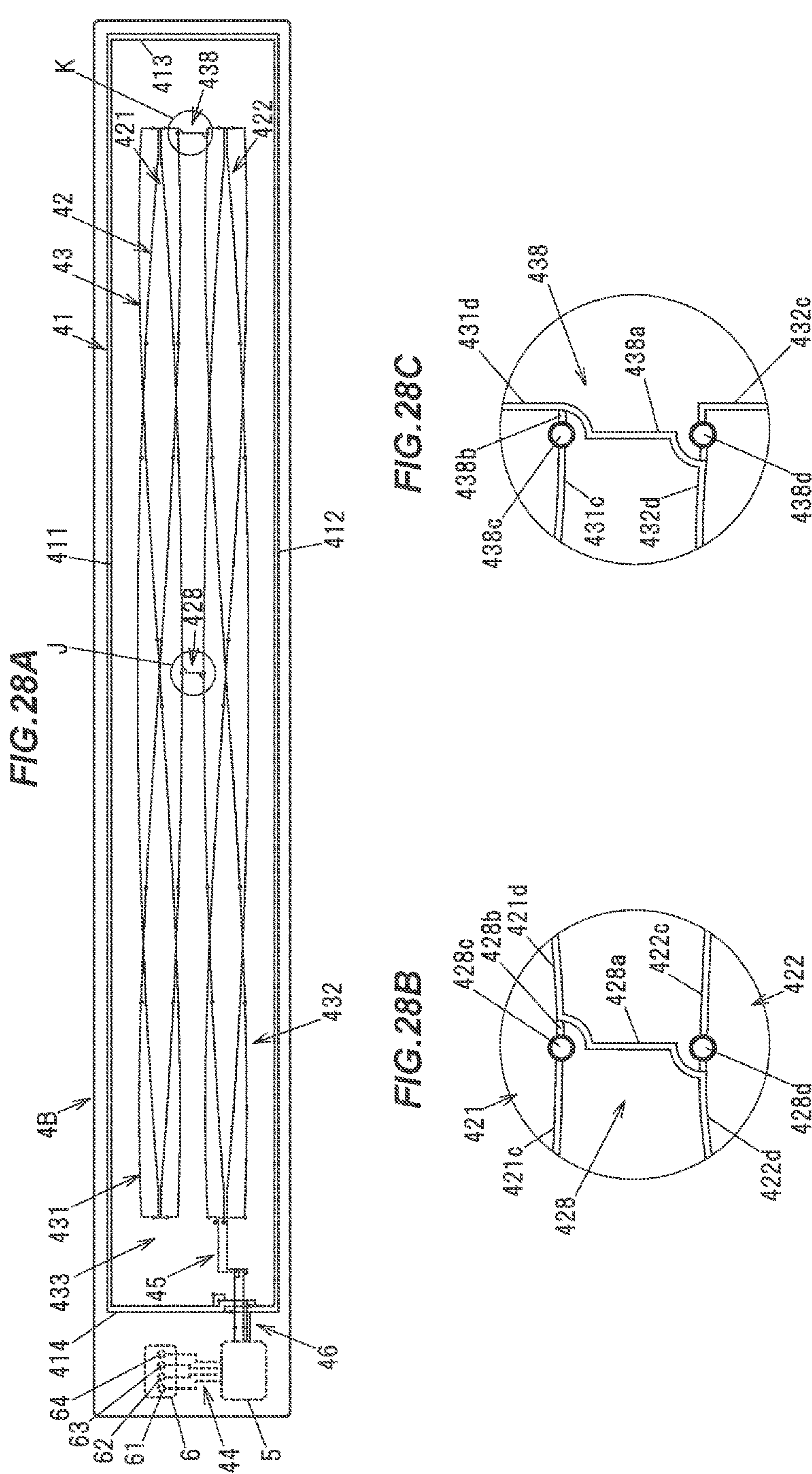
FIGS. 28A to 28C are explanatory diagrams showing the configuration of a substrate in the fourth embodiment.
Figure 29A:
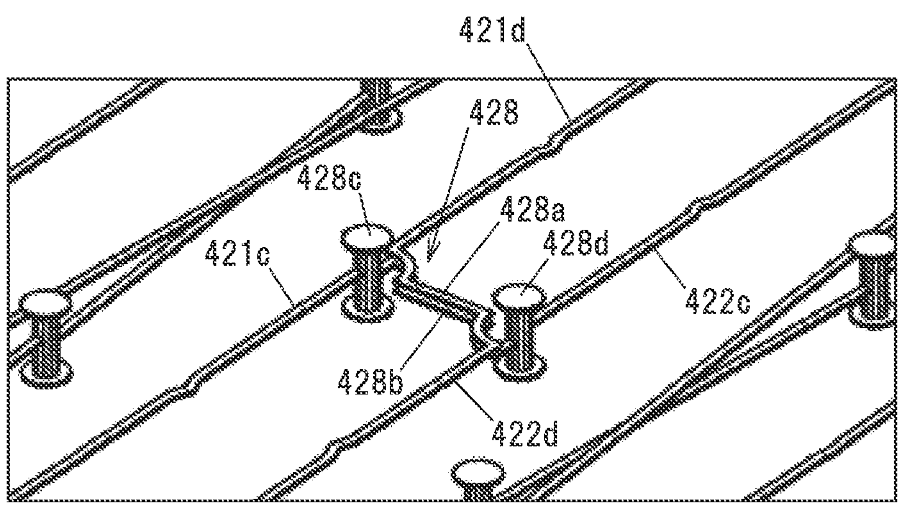
FIG. 29A is a perspective view showing the wiring pattern in the vicinity of a J part in FIG. 28A.
Figure 29B:
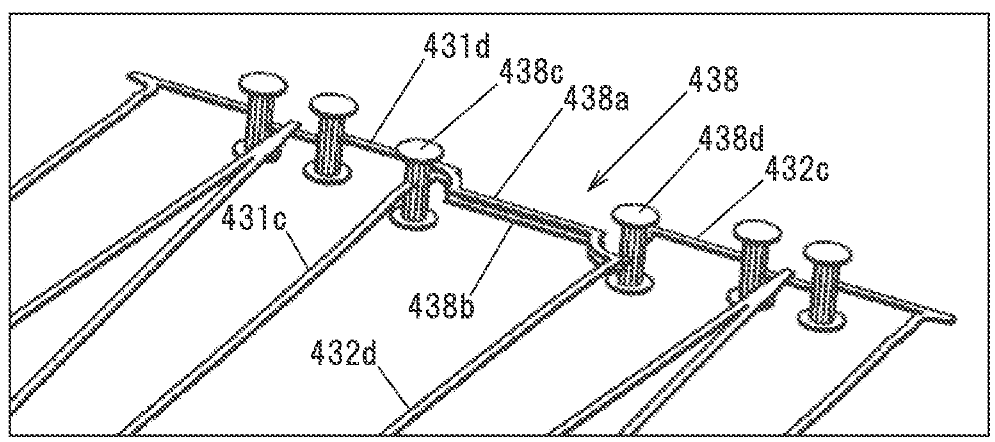
FIG. 29B is a perspective view showing the wiring pattern in the vicinity of a K part in FIG. 28A.

FIG. 28A is a plan view of the wiring patterns of the first to fourth wiring layers 401 to 404 in the substrate 4B superimposed on each other. FIG. 28B is an enlarged view of part J in FIG. 28A. FIG. 28C is an enlarged view of part K in FIG. 27A. FIG. 29A is a perspective view showing the wiring pattern in the vicinity of part J in FIG. 28A. FIG. 29B is a perspective view showing the wiring pattern in the vicinity of part K in FIG. 28A.

In the second and third embodiments, the case where the connecting paths 423, 426 of the sine wave-shaped detection coil 42 extend along the longitudinal direction of the substrates 4, 4A between the first portion 421 and the second portion 422, and the connecting paths 433, 436 of the cosine wave-shaped detection coil 43 extend between the first portion 431 and the second portion 432 of the substrates 4, 4A is described. In the present embodiment, the connecting path 428 of the sine wave-shaped detection coil 42 extends along the shortitudinal direction of the substrate 4B and connects the first portion 421 and the second portion 422, and the connecting path 438 of the cosine wave-shaped detection coil 43 extends in the shortitudinal direction of the substrate 4B and connects the first portion 431 and the second portion 432.

The connecting path 428 of the sine wave-shaped detection coil 42 connects the end of the second portion 422 side in the first portion 421 and the end of the first portion 421 side in the second portion 422 at the center of the sine wave-shaped detection coil 42 in the longitudinal direction of the substrate 4B. The connecting path 438 of the cosine wave-shaped detection coil 43 connects the end of the second portion 432 side in the first portion 431 and the end of the first portion 431 side in the second portion 432 at the ends of the cosine wave-shaped detection coil 43 in the longitudinal direction of the substrate 4B.

The connecting path 428 of the sine wave-shaped detection coil 42 has first and second connecting wires 428*a*, 428*b* and first and second vias 428*c*, 428*d*, wherein the first and second connecting wires 428*a*, 428*b* extend in the aligning direction of the first portion 421 and the second portion 422 of the sine wave-shaped detection coil 42. The first connecting wire 428*a* is formed in the second wiring layer 402 and the second connecting wire 428*b* is formed in the third wiring layer 403. In FIGS. 28A to 28C, the second connecting wire 428*b* is shown in gray. The first connecting wire 428*a* and the second connecting wire 428*b* have opposite polarity, and a potential difference is generated between the first connecting wire 428*a* and the second connecting wire 428*b* in accordance with the output voltage of the sine wave-shaped detection coil 42.

The first portion 421 of the sine wave-shaped detection coil 42 has a pair of conductor wires 421*c*, 421*d* aligned in the longitudinal direction of the substrate 4B across the first vias 428*c*, of which one conductor wire 421*c* is connected to the second connecting wire 428*b* by the first vias 428*c* and the other conductor wire 421*d* is directly connected to the first connecting wire 428*a*. The second portion 422 of the sine wave-shaped detection coil 42 has a pair of conductor wires 422*c*, 422*d* aligned in the longitudinal direction of the substrate 4B across the second via 428*d*, of which one conductor wire 422*c* is connected to the second connecting wire 428*b* by the second via 428*d* and the other conductor wire 422*d* is directly connected to the first connecting wire 428*a*.

The first connecting wire 428*a* and the second connecting wire 428*b* are formed to overlap in the thickness direction of the substrate 4B, except around the first and second vias 428*c*, 428*d*, so that the magnetic flux interlinked between the first connecting wire 428*a* and the second connecting wire 428*b* is reduced. The first connecting wire 428*a* and the second connecting wire 428*b* connect the first portion 421 and the second portion 422 of the sine wave-shaped detection coil 42 at the shortest distance in the shortitudinal direction of the substrate 4B, so that the magnetic flux interlinked between the first connecting wire 428*a* and the second connecting wire 428*b* is further reduced.

Similarly, the connecting path 438 of the cosine wave-shaped detection coil 43 has first and second connecting wires 438*a*, 438*b* and first and second vias 438*c*, 438*d*, and the first and second connecting wires 438*a*, 438*b* extend in the alignment direction with the first portion 431 and the second portion 432 of the cosine wave-shaped detection coil 43. The first connecting wire 438*a* is formed in the second wiring layer 402 and the second connecting wire 438*b* is formed in the third wiring layer 403. In FIGS. 28A to 28C, the second connecting wire 438*b* is shown in gray. The first connecting wire 438*a* and the second connecting wire 438*b* have opposite polarity, and a potential difference is generated between the first connecting wire 438*a* and the second connecting wire 438*b* according to the output voltage of the cosine wave-shaped detection coil 43.

The first portion 431 of the cosine wave-shaped detection coil 43 has a conductor wire 431*c* extending in the longitudinal direction of the substrate 4B, and a conductor wire 431*d* extending in the shortitudinal direction of the substrate 4B, and the conductor wire 431*c* is connected to the second connecting wire 438*b* by the first via 438*c* and the conductor wire 431*d* is connected directly to the first connecting wire 438*a*. The second portion 432 of the cosine wave-shaped detection coil 43 has a conductor wire 432*c* extending in the shortitudinal direction of the substrate 4B, and a conductor wire 432*d* extending in the long direction of the substrate 4B, and the conductor wire 432*c* is connected to the second connecting wire 438*b* by the second via 438*d* and the conductor wire 432*d* is directly connected to the first connecting wire 438*a*.

The first connecting wire 438*a* and the second connecting wire 438*b* are formed to overlap in the thickness direction of the substrate 4B, except around the first and second vias 438*c*, 438*d*, so that the magnetic flux interlinked between the first connecting wire 438*a* and the second connecting wire 438*b* is reduced. The first connecting wire 438*a* and the second connecting wire 438*b* connect the first portion 431 and the second portion 432 of the cosine wave-shaped detection coil 43 at the shortest distance in the shortitudinal direction of the substrate 4B, so that the magnetic flux interlinked between the first connecting wire 438*a* and the second connecting wire 438*b* is further reduced.

Figure 30:
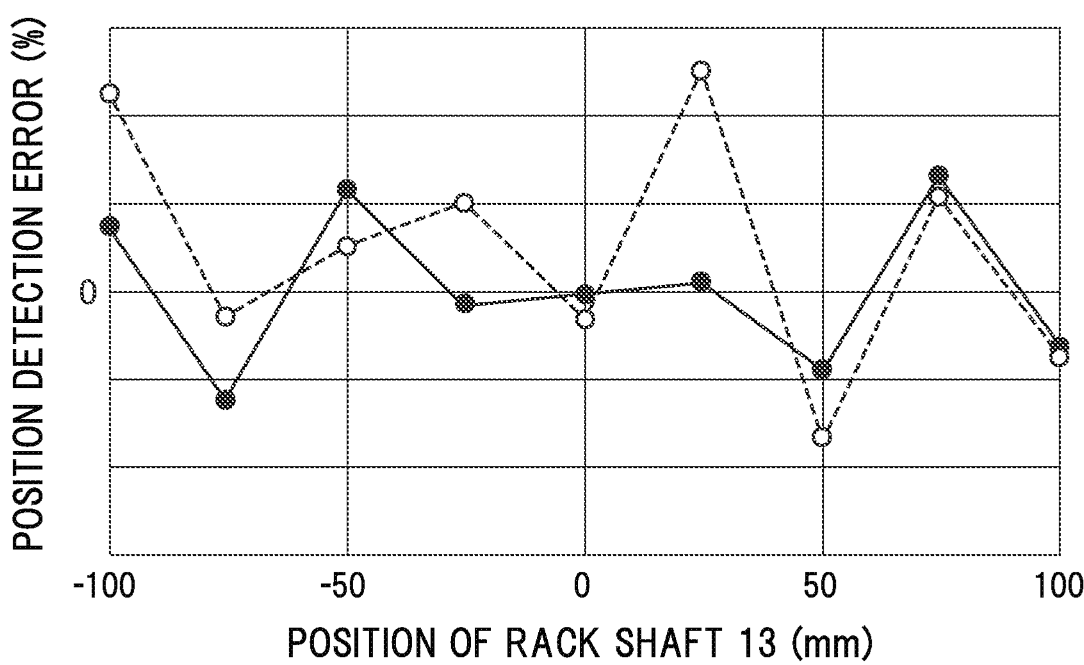
FIG. 30 is a graph showing a position detection error in the fourth embodiment.

FIG. 30 is a graph showing the amount of movement of the rack shaft 13 from the neutral position to the left or right direction on the horizontal axis and the detection error of the position of the rack shaft 13 on the vertical axis. In this graph, the white circle shows the detection error when the substrate 3 in the first embodiment is used, and the black circle shows the detection error when the substrate 4B in the fourth embodiment is used. As shown in FIG. 30, when the substrate 4B in the fourth embodiment is used, the detection error is smaller on average than when the substrate 3 of the first embodiment is used. In addition, the maximum value of detection error is smaller when the substrate 4B in the fourth embodiment is used than when the substrate 3 in the first embodiment is used.

According to the fourth embodiment described above, the voltage induced in the connecting path 428 of the sine wave-shaped detection coil 42 and the connecting path 438 of the cosine wave-shaped detection coil 43 by the alternating magnetic field generated by the excitation coil 41 is suppressed and the detection accuracy of the position of the rack shaft 13 is improved. The shield patterns 491, 492 in the third embodiment may be provided on the substrate 4B in the fourth embodiment to further suppress the magnetic flux interlinked to the connecting paths 428, 438 of the substrate 4B.

Summary of the Embodiments and Modified Examples

Next, the technical concepts that can be grasped from the first to fourth embodiments and modified examples described above will be described with the aid of the symbols, etc. in the first through fourth embodiments and variations. However, each code in the following description does not limit the components in the claims to the parts, etc. specifically shown in the first to fourth embodiments and modified examples.

According to the first feature, a position detection device 1 (stroke sensor 1) for detecting the position of a shaft (rack shaft 13) that moves forward and backward in the axial direction includes an excitation coil 31, 41 that generates an alternating magnetic field; a target 2 which is fixed to the shaft 13 and in which the magnetic flux of the alternating magnetic field is interlinked; and a detection coil 32, 33, 42, 43 in which the magnetic flux of the alternating magnetic field is interlinked, wherein the detection coil 32, 33 has a first portion 321, 331, 421, 431 and a second portion 322, 332, 422, 432 where an induced voltage is generated by the magnetic flux of the alternating magnetic field being interlinked, and a connecting path 323, 333, 423, 433, 426, 436, 428, 438 connecting one axial end of the first portion 321, 331, 421, 431 and an other axial end of the second portion 322, 332, 422, 432, wherein the first portion 321, 331, 421, 431 and the second portion 322, 332, 422, 432 respectively extend along the axial direction and the coil longitudinal direction parallel to the axial direction and at least a portion of each is aligned in an alignment direction perpendicular to the axial direction, wherein the target 2 has a first target portion 21 facing the first portion 321, 331, 421, 431 and a second target portion 22 facing the second portion 322, 332, 422, 432, wherein the induced voltage generated in the first portion 321, 331, 421, 431 changes according to the position of the first target portion 21 relative to the first portion 321, 331, 421, 431, wherein the induced voltage generated in the second portion 322, 332, 422, 432 changes according to the position of the second target portion 22 relative to the second portion 322, 332, 422, 432.

According to the second feature, in the position detection device 1 as described by the first feature, the excitation coil 31 and the detection coil 32, 33 are formed on a single substrate 3, 3A, 4, 4A, 4B.

According to the third feature, in the position detection device 1 as described by the second feature, in the axial direction, the first target portion 21 and the second target portion 22 are offset from each other in such a manner that a total length of an overlap length $L_1$ in which the first portion 321, 331, 421, 431 of the detection coil 32, 33, 42, 43 and the first target portion 21 overlap in a direction perpendicular to the substrate 3, 3A, 4, 4A, 4B and an overlap length $L_2$ in which the second portion 322, 332, 422, 432 of the detection coil 32, 33, 42, 43 and the second target portion 22 overlap in the direction perpendicular to the substrate 3, 3A, 4, 4A, 4B is constant.

According to the fourth feature, in the position detection device 1 as described by any one of the first to third features, the detection coil 32, 33, 42, 43 is composed of two detection coils 32, 33, 42, 43, and phases of the voltages induced respectively in the two detection coils 32, 33, 42, 43 during the movement of the shaft 13 from one axial moving end to the other axial moving end are different from each other.

According to the fifth feature, in the position detection device 1 as described by the fourth feature, the excitation coil 31 and the two detection coils 32, 33, 42, 43 are formed on a single substrate 3, 3A, 4, 4A, 4B, and the two detection coils 32, 33, 42, 43 are stacked in the thickness direction of the substrate 3, 3A, 4, 4A, 4B.

According to the sixth feature, in the position detection device 1 as described by the fifth feature, the two detection coils 32, 33, 42, 43 are formed inside the excitation coil 31.

According to the seventh feature, in the position detection device 1 as described by the first feature, the detection coil 32, 33, 42, 43 includes the first portion 321, 331, 421, 431 and the second portion 322, 332, 422, 432 that respectively form a combined shape with a pair of sine wave-shaped conductor wires 32*a*, 32*b*, 33*a*, 33*b* that are symmetrical across a symmetry axis line $A_{321}$, $A_{322}$, $A_{331}$, $A_{332}$ extending in the axial direction, when viewed from a thickness direction of the substrate 3, 3A, 4, 4A, 4B, and the first portion 321, 331, 421, 431 and the second portion 322, 332, 422, 432 have opposite arrangements of the pair of sine wave-shaped conductor wires 32*a*, 32*b*, 33*a*, 33*b* with respect to the symmetry axis line $A_{321}$, $A_{322}$, $A_{331}$, $A_{332}$.

According to the eighth feature, in the position detection device 1 as described by the seventh feature, a length of the first portion 321, 331, 421, 431, and a length of the second portion 322, 332, 422, 432 in the axial direction are the same, and wherein the whole of the first portion 321, 331, 421, 431 and the whole of the second portion 322, 332, 422, 432 are aligned in an alignment direction perpendicular to the axial direction.

According to the ninth feature, in the position detection device 1 as described by any one of the second to eighth features, the connecting path 423, 433 has first to fourth connecting wires 423*a* to 423*d*, 433*a* to 433*d* extending along the axial direction between the first portion 421, 431 and the second portion 422, 432 in the alignment direction, the first connecting wire 423*a*, 433*a* and the second connecting wire 423*b*, 433*b* are short-circuited at both ends of the connecting path 423, 433, the third connecting wire 423*c*, 433*c* and the fourth connecting wire 423*d*, 433*d* are short-circuited at both ends of the connecting path 423, 433, polarities of the first and second connecting wires 423*a*, 423*b*, 433*a*, 433*b* and the third and fourth connecting wires 423*c*, 423*d*, 433*c*, 433*d* are opposite, the substrate 4 is a multilayer substrate having multiple wiring layers 401 to 404, the first connecting wire 423*a*, 433*a* and the third connecting wire 423*c*, 433*c* are aligned in a thickness direction of the substrate 4, the second connecting wire 423*b*, 433*b* and the fourth connecting wire 423*d*, 433*d* are aligned in the thickness direction of the substrate 4, the first connecting wire 423*a*, 433*a* and the fourth connecting wire 423*d*, 433*d* are formed on the same layer 402 of the substrate 4, and the second connecting wire 423*b*, 433*b* and the third connecting wire 423*c*, 433*c* are formed on the same layer 403 of the substrate 4.

According to the tenth feature, in the position detection device 1 as described by any one of the second to eighth features, a planar shield pattern 491, 492 is formed on the substrate 4A to suppress magnetic flux interlinked to the connecting paths 426, 436.

According to the eleventh feature, in the position detection device 1 as described by any one of the second to eighth features, the connecting path 428, 438 has a pair of connecting wires 428*a*, 428*b*, 438*a*, 438*b* extending in the alignment direction between the first portion 421, 431 and the second portion 422, 432, the pair of connecting wires 428*a*, 428*b*, 438*a*, 438*b* are aligned in a thickness direction of the substrate 4A.

According to the twelfth feature, in the position detection device 1 as described by any one of the first to eighth features, the excitation coil 41 has a pair of extending portions 411, 412 extending in the axial direction, the detection coil 42, 43 is provided between one extending portion 411 of the pair of extending portions 411, 412 on the first portion 421, 431 side and the other extending portion 412 of the pair of extending portions 411, 412 on the second portion 422, 432 side, the target 2 is made of a conductor in which eddy currents are generated by the alternating magnetic field, the first target portion 21 faces an end of one extending portion 411 side in the first portion 421, 431 in the alignment direction and does not face an end of the second portion 422, 432 side in the first portion 421, 431 in the alignment direction, and the second target portion 22 faces an end of the other extending portion 412 side in the second portion 422, 432 in the alignment direction and does not face an end of the first portion 421, 431 side in the second portion 422, 432 in the alignment direction.

According to the thirteenth feature, in the position detection device 1 as described by the first feature, the excitation coil 41 has a pair of extending portions 411, 412 extending in the axial direction, and the detection coil 42, 43 is provided between one of the pair of extending portions 411, 412 on the first portion 421, 431 side and the other extending portion 412 on the second portion 422, 432 side, the target 2 is composed of a high permeability material, and the first target portion 21 faces an end of the second portion 422, 432 side in the first portion 421, 431 in the alignment direction and does not face an end of the one extending portion 411 side in the first portion 421, 431 in the alignment direction, the second target portion 22 faces an end on the first portion 421, 431 in the second portion 422, 432 in the alignment direction but does not face an end of the other extending portion 412 side in the second portion 422, 432 in the alignment direction.

According to the fourteenth feature, in the position detection device 1 as described by the first feature, the shaft 13 is a rack shaft of a steering device for a vehicle.

The first to fourth embodiments and modified examples of the invention have been described above. The first to fourth embodiments and modified example do not limit the invention as claimed. It should also be noted that not all of the combinations of features described in the first to fourth embodiments and modified examples are essential to the means for solving the problems of the invention. Furthermore, the invention can be implemented with appropriate modifications to the extent that it does not depart from the gist of the invention, for example, the invention can be implemented with the following modifications.

The first to fourth embodiments describe a case in which the first target portion 21 and the second target portion 22 are provided protruding from the rack shaft 13 toward the substrate 3, but it is not limited to this case. For example, the target 2 may be a flat plate long in the axial direction of the rack shaft 13, and the first target portion 21 and the second target portion 22 may be formed as recesses or notches. Even in this case, the position of the rack shaft 13 can be detected in the same way as in the above embodiment, because the magnetic flux density changes between the portion facing the first target portion 21 and the second target portion 22 and the portion not facing them.

Also, the above embodiments describe a case in which the detection coils 32, 33, 42, 43 are sine wave-shaped, but it is not limited to this case, for example, they may be triangular wave-shaped. Furthermore, the excitation coils 31, 41 and the detection coils 32, 33, 42, 43 do not necessarily have to be formed on a substrate.

The invention claimed is:

1. A position detection device configured to detect a position of a shaft that moves forward and backward in an axial direction, comprising:

an excitation coil that generates an alternating magnetic field;

a target which is fixed to the shaft and in which a magnetic flux of the alternating magnetic field is interlinked; and a detection coil in which the magnetic flux of the alternating magnetic field is interlinked, wherein the detection coil has a first portion and a second portion, where an induced voltage is generated by the magnetic flux of the alternating magnetic field being interlinked, and a connecting path connecting the first portion and the second portion, wherein the first portion and the second portion respectively extend along the axial direction and the coil longitudinal direction parallel to the axial direction and at least a portion of each is aligned in an alignment direction perpendicular to the axial direction, wherein the target comprises a first target portion facing the first portion, and a second target portion facing the second portion, wherein the induced voltage generated in the first portion changes according to a position of the first target portion relative to the first portion, wherein the induced voltage generated in the second portion changes according to a position of the second target portion relative to the second portion.

2. The position detection device, according to claim 1, wherein the excitation coil and the detection coil are formed on a substrate arranged parallel to the shaft.

3. The position detection device, according to claim 2, wherein, in the axial direction, the first target portion and the second target portion are offset from each other in such a manner that a total length of an overlap length in which the first portion of the detection coil and the first target portion overlap in a direction perpendicular to the substrate and an overlap length in which the second portion of the detection coil and the second target portion overlap in the direction perpendicular to the substrate is constant.

4. The position detection device, according to claim 3, wherein the detection coil comprises two detection coils, and phases of the voltages induced respectively in the two detection coils during movement of the shaft from one axial moving end to an other axial moving end are different from each other.

5. The position detection device, according to claim 4, wherein the excitation coil and the two detection coils are formed on the substrate, wherein the two detection coils are stacked in a thickness direction of the substrate.

6. The position detection device, according to claim 5, wherein the two detection coils are formed inside the excitation coil.

7. The position detection device, according to claim 2, the detection coil includes the first portion and the second portion that respectively form a combined shape with a pair of sine wave-shaped conductor wires that are symmetrical across a symmetry axis line extending in the axial direction, when viewed from a thickness direction of the substrate, wherein the first portion and the second portion have opposite arrangements of the pair of sine wave-shaped conductor wires with respect to the symmetry axis line.

8. The position detection device, according to claim 7, wherein a length of the first portion and a length of the second portion in the axial direction are same, and wherein whole of the first portion and whole of the second portion are aligned in an alignment direction perpendicular to the axial direction.

9. The position detection device, according to claim 2, wherein the connecting path includes first to fourth connecting wires extending along the axial direction between the first portion and the second portion in the alignment direction, wherein the first connecting wire and the second connecting wire are short-circuited at both ends of the connecting path, wherein the third connecting wire and the fourth connecting wire are short-circuited at both ends of the connecting path, wherein polarities of the first and second connecting wires and the third and fourth connecting wires are opposite, wherein the substrate is a multilayer substrate having multiple wiring layers, wherein the first connecting wire and the third connecting wire are aligned in a thickness direction of the substrate, wherein the second connecting wire and the fourth connecting wire are aligned in the thickness direction of the substrate, wherein the first connecting wire and the fourth connecting wire are formed on a same layer of the substrate, and wherein the second connecting wire and the third connecting wire are formed on a same layer of the substrate.

10. The position detection device, according to claim 2, wherein a planar shield pattern is formed on the substrate to suppress magnetic flux interlinked to the connecting wire.

11. The position detection device, according to claim 2, wherein the connecting path include a pair of connecting wires extending in the alignment direction between the first portion and the second portion, wherein the pair of connecting wires are aligned in a thickness direction of the substrate.

12. The position detection device, according to claim 1, wherein the excitation coil includes a pair of extending portions extending in the axial direction, wherein the detection coil is provided between one extending portion of the pair of extending portions on a first portion side and an other extending portion of the pair of extending portions on a second portion side, wherein the target comprises a conductor in which eddy currents are generated by the alternating magnetic field, wherein the first target portion faces an end of a one extending portion side of the first portion in the alignment direction and does not face an end of a second portion side of the first portion in the alignment direction, and wherein the second target portion faces an end of an other extending portion side of the second portion in the alignment direction and does not face an end of a first portion side of the second portion in the alignment direction.

13. The position detection device, according to claim 1, wherein the excitation coil includes a pair of extending portions extending in the axial direction, wherein the detection coil is provided between one of the pair of extending portions on a first portion side and an other extending portion on a second portion side, wherein the target comprises a high permeability material, wherein the first target portion faces an end of a second portion side in the first portion in the alignment direction and does not face an end of a one extending portion side in the first portion in the alignment direction, wherein the second target portion faces an end of a first portion side in the second portion in the alignment direction and does not face an end of an other extending portion side in the second portion in the alignment direction.

14. The position detection device, according to claim 1, wherein the shaft is a rack shaft of a steering device for a vehicle.

* * * * *